US012303799B2

(12) United States Patent
Cai

(10) Patent No.: US 12,303,799 B2
(45) Date of Patent: *May 20, 2025

(54) ASSEMBLED ROBOT TOY

(71) Applicant: Zeluan Cai, Guangdong (CN)

(72) Inventor: Zeluan Cai, Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/778,277

(22) Filed: Jul. 19, 2024

(65) Prior Publication Data
US 2025/0058239 A1 Feb. 20, 2025

(30) Foreign Application Priority Data

Aug. 18, 2023 (CN) .......................... 202311047616.X
Jul. 3, 2024 (CN) ............................ 202421562832.8

(51) Int. Cl.
*A63H 17/26* (2006.01)
*A63H 29/20* (2006.01)
*B25J 11/00* (2006.01)

(52) U.S. Cl.
CPC ............. *A63H 17/26* (2013.01); *A63H 29/20* (2013.01); *B25J 11/0015* (2013.01)

(58) Field of Classification Search
CPC ............................. B25J 11/0015; A63H 17/26
See application file for complete search history.

(56) References Cited

U.S. PATENT DOCUMENTS

| 4,199,894 A * | 4/1980 | Fischer ............... A63H 33/042 |
| | | 136/251 |
| 4,310,987 A * | 1/1982 | Chieffo .................. A63H 29/22 |
| | | 446/175 |
| 4,333,262 A * | 6/1982 | Kimura .................. A63H 29/22 |
| | | 310/40 MM |
| 4,575,354 A * | 3/1986 | Wakayama .......... A63H 17/004 |
| | | 180/7.1 |
| 5,145,442 A * | 9/1992 | Zan ......................... A63H 29/22 |
| | | 446/163 |
| 6,605,914 B2 * | 8/2003 | Yim ....................... A63H 33/042 |
| | | 901/23 |

(Continued)

FOREIGN PATENT DOCUMENTS

DE   202004008075 U1 *  9/2004  .......... H01M 50/213
EP      0124237 A1 *  11/1984

OTHER PUBLICATIONS

Translation DE202004008075U1 (Year: 2004).*

*Primary Examiner* — Eugene L Kim
*Assistant Examiner* — Alyssa M Hylinski

(57) ABSTRACT

An assembled robot toy includes a power supply module, a gear box, a rod component, a head part and an assembly component. The head part and the assembly component are detachably arranged on the gear box. The gear box includes a motor, a first gear, and a transmission gear set. The power supply module is a solar panel. The power supply module is electrically connected to the motor. The first gear is arranged on a rotating shaft of the motor. The transmission gear set includes a second gear that meshes with the first gear. A total number of teeth of the first gear is less than that of the second gear. The rod component is connected to the second gear, and the assembly component is connected to the transmission gear set and/or the rod component. The rod component and the transmission gear set are used for power outputs.

19 Claims, 38 Drawing Sheets

(56) References Cited

U.S. PATENT DOCUMENTS

| | | | | |
|---|---|---|---|---|
| 7,905,760 | B2* | 3/2011 | Yoneda | B25J 9/1615 |
| | | | | 446/353 |
| 8,956,198 | B1* | 2/2015 | Chang | A63H 11/18 |
| | | | | 446/433 |
| 9,592,603 | B2* | 3/2017 | Hardouin | B25J 13/003 |
| 9,975,238 | B2* | 5/2018 | Fei | B25J 9/08 |
| 11,279,043 | B2* | 3/2022 | Zhang | B25J 11/008 |
| 11,944,918 | B1* | 4/2024 | Cai | A63H 29/22 |
| 2002/0081937 | A1* | 6/2002 | Yamada | A63H 11/00 |
| | | | | 446/175 |
| 2015/0321348 | A1* | 11/2015 | Rollinson | B25J 9/065 |
| | | | | 901/23 |
| 2016/0158942 | A1* | 6/2016 | Augenbraun | B25J 11/0085 |
| | | | | 901/10 |
| 2017/0221383 | A1* | 8/2017 | Karol | A63H 17/002 |
| 2018/0370025 | A1* | 12/2018 | Didey | B25J 9/102 |
| 2022/0047961 | A1* | 2/2022 | Yin | A63H 30/04 |

* cited by examiner

ASSEMBLED ROBOT TOY

CROSS-REFERENCE TO RELATED APPLICATIONS

The application claims priority of Chinese patent application CN202311047616X, filed on Aug. 18, 2023, and CN2024215628328, filed on Jul. 3, 2024, which is incorporated herein by reference in its entireties.

TECHNICAL FIELD

The present disclosure relates to the technical field of assembly toys, in particular to an assembled robot toy.

BACKGROUND ART

As is well known, an assembled toy is a toy with a certain shape assembled by using parts with various shapes. However, at present, the existing assembled electric toys can only be assembled into one shape and be driven in that shape, which is extremely limited and cannot effectively stimulate children's creativity. In addition, the power output of an existing driving mechanism generally refers to a power output end through one or more rotating rods, so that the power transmission of the assembled electric toy starts from two sides, resulting in the limitation of assembly.

SUMMARY

The main purpose of the present disclosure is to provide an assembled robot toy so as to solve the problem that an assembled electric toy is limited because power of a driving mechanism of an existing assembled electric toy is output from two ends.

In order to solve the above technical problem, the technical solution of the present disclosure is as follows.

An assembled robot toy includes a power supply module, a gear box, a rod component, a head part and an assembly component. The head part and the assembly component are detachably arranged on the gear box.

The gear box includes a motor, a first gear, and a transmission gear set. The first gear is arranged on a rotating shaft of the motor. The transmission gear set includes a second gear that meshes with the first gear. A total number of teeth of the first gear is less than a total number of teeth of the second gear. The rod component is connected to the second gear, and the assembly component is connected to the transmission gear set and/or the rod component.

The rod component is configured for rotating through the transmission of the first gear and the transmission gear set when the motor is driven, and at least one part of the assembly component is configured for moving and driving the gear box and the head part to move when the transmission gear set and/or the rod component rotate.

The power supply module includes a solar panel for converting light energy into electrical energy, and the solar panel is electrically connected to the motor.

In one embodiment, the solar panel is arranged on one of the head part, the assembly component, and the gear box. The solar panel is used for converting light energy into electrical energy and transmitting the electrical energy to the motor. The motor is configured for receiving the electrical energy transmitted by the solar panel and being driven.

In one embodiment, the assembled robot toy further includes a control module and a battery. The battery is installed on the head part or the gear box. The solar panel, the motor, and the battery are all electrically connected to the control module. The solar panel is used for converting light energy into electrical energy and transmitting the electrical energy to the control module. The control module is used for receiving the electrical energy, and directly driving the motor and/or storing the electrical energy on the battery after processing the electrical energy.

In one embodiment, the assembled robot toy further includes a control switch electrically connected to the control module. The control module is further used for driving the motor when the control switch is operated.

In one embodiment, the assembled robot toy further includes a wireless module electrically connected to the control module. The wireless module is configured for receiving a wireless signal from an external device and transmitting the wireless signal to the control module. The control module is configured for receiving the wireless signal and driving the motor to work.

In one embodiment, the assembled robot toy further includes an audio player electrically connected to the control module. The control module drives the audio player to play audio when the control switch is operated or the wireless signal is received.

In one embodiment, the assembled robot toy further includes a voice module electrically connected to the control module, and the voice module is used for storing audio data. The control module drives the audio player to play the audio in the audio data when the control switch is operated or the wireless signal is received.

In one embodiment, the assembled robot toy further includes a display electrically connected to the control module, and the display is used for displaying display data transmitted by the control module. The display data at least includes an electrical quantity of the battery.

In one embodiment, the rod component includes a first rotating rod and a second rotating rod. The second gear is arranged on the first rotating rod.

The transmission gear set includes: a third gear arranged on the first rotating rod, a fourth gear and a fifth gear both arranged on the second rotating rod, and a sixth gear engaged with the fifth gear. The sixth gear is arranged on the first rotating rod, the fifth gear is connected to the fourth gear, the third gear is engaged with the fourth gear, and the fifth gear is engaged with the sixth gear. A total number of teeth of the third gear is less than a total number of teeth of the fourth gear. A total number of teeth of the fifth gear is less than a total number of teeth of the sixth gear. The first rotating rod is connected to the assembly component.

The first rotating rod rotates through the transmission of the first gear and the second gear when the motor is driven. The third gear is driven to rotate when the first rotating rod rotates, the fourth gear is driven to rotate when the third gear rotates, the fifth gear is driven to rotate when the fourth gear rotates, the sixth gear is driven to rotate when the fifth gear rotates, and the first rotating rod is driven to rotate when the fifth gear rotates. The assembly component is configured for moving when the first rotating rod or the sixth gear rotates.

In one embodiment, the transmission gear set further includes a seventh gear and an eighth gear. The seventh gear and the eighth gear are arranged on the first rotating rod. The seventh gear is a spur gear, and the eighth gear is a spur gear. The gear box is provided with a first avoidance hole at the position corresponding to the seventh gear and the eighth gear. The seventh gear and the eighth gear are both driven to rotate when the first rotating rod rotates. A diameter of the seventh gear is smaller than a diameter of the eighth gear.

The assembly component is connected to one or more of the first rotating rod, the seventh gear, and the eighth gear.

The rod component further includes a plurality of transmission rods connected to the assembly component, at least two transmission rods are disposed at both ends of the first rotating rod, and the transmission rod connected to the first rotating rod is at least partially extended into the gear box. The gear box is provided with a second avoidance hole at the position corresponding to the transmission rod.

In one embodiment, the first shell protrudes on one side opposite to the second shell to form a plurality of first plugging ends, a plurality of first plugging grooves are formed in one side, opposite to the first shell, of the second shell, and the first plugging end is arranged in the first plugging groove.

The gear box also includes a plurality of reinforcing cover plates. A plurality of first clamping holes are formed in the reinforcing cover plate. A plurality of first clamping buckles are arranged on both sides of the first shell and the second shell. The first clamping buckle is clamped with the first clamping hole.

In one embodiment, the head part is rotatably connected with the gear box, and the head part is positioned at one of the top, front and back positions of the gear box.

In one embodiment, a first connecting rod and a second connecting rod are arranged between the head part and the gear box, and the first connecting rod is rotatably connected with the second connecting rod.

The first connecting rod is configured to drive the head part to rotate along a central axis of the first connecting rod under the action of external force, and the second connecting rod is configured to drive the head part to rotate along a direction perpendicular to the central axis of the first connecting rod under the action of external force.

In one embodiment, the solar panel is arranged on the head part, and the head part includes a bottom shell, a face shell which is detachably connected with the bottom shell and forms a third mounting cavity and two fourth mounting cavities with the bottom shell, and two conducting springs respectively arranged in the two fourth mounting cavities and soldered onto the solar panel.

The solar panel is arranged in the third mounting cavity, the two fourth mounting cavities are arranged at intervals and are both communicated with the third mounting cavity, a third avoidance hole is formed in the face shell and/or the bottom shell at the position corresponding to the fourth mounting cavity, a display port is formed in the face shell at the position corresponding to the solar panel, the motor is electrically connected with two conducting wires, the tail end of the conducting wire is provided with a conducting plate, and the conducting plate is plugged in the conducting spring.

In one embodiment, the bottom of one end of the face shell extends downward to form a second plugging end, the bottom of an opposite end of the face shell extends downward to form a plurality of first stop blocks arranged at intervals, and the first stop block protrudes at the bottom of one side opposite to the second plugging end to form a second stop block.

A second plugging groove with a length larger than the length of the second plugging end is formed in the bottom shell, a front end of the bottom shell is arranged above the second stop block, and the second plugging end is arranged in the second plugging groove.

The head part also includes a plurality of cover bodies with accommodating grooves, the bottom shell is connected with the face shell to form first joint ends on both sides of the head part, and the first joint ends are arranged in the accommodating grooves.

In one embodiment, the assembly component includes a plurality of bolts, fixed plates, connecting plates, third rotating rods, wheels, straight-line connecting rods, symmetrical semicircular pieces, U-shaped pieces, force arm connecting rods, arc-shaped connecting rods, T-shaped connecting rods, first cams, second cams, fluctuating gears, accessory spur gears and fixed rods.

Any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod. The accessory spur gear can be used for being meshed with the transmission gear set. The accessory spur gear, the wheel, the first cam, the second cam, the fluctuating gear and the wheel can detachably sleeve the third rotating rod or the fixed rod, and the second cam is detachably inserted on the transmission rod.

In one embodiment, a first sliding hole and a second sliding hole perpendicular to the first sliding hole are formed in the T-shaped connecting rod, and the fluctuating gear is provided with a plurality of arc-shaped teeth arranged around the fluctuating gear. The symmetrical semicircular piece is formed by connecting two semicircular plates in central symmetry, a side wall of the second cam is surrounded by first gear teeth, and an inner side of the arc-shaped connecting rod is provided with second gear teeth meshed with the second cam.

At least one plane is formed on an outer side wall of the third rotating rod.

In one embodiment, a plurality of annular clamping grooves are formed in the outer side walls of the fixed rod and the third rotating rod at equal intervals, the assembly component also includes a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove.

The position of the accessory spur gear on the third rotating rod or the fixed rod is limited by two fixed sleeves respectively sleeving both sides of the accessory spur gear.

A cross section of the outer side wall of the third rotating rod is a hexagon, a cross section of an outer side wall of the fixed rod is circular, and the diameter of the fixed rod is equal to the distance between two opposite sides of the hexagon.

The present disclosure has the following beneficial effects. Compared with the prior art, in the present embodiment, the head part and the assembly component are detachably configured on the gear box. The head part is used as the head of the robot, the assembly component 3 is a component of the toy shape, and the rod component and the transmission gear set are used for power outputs. In this way, a user can assemble the assembly component according to the position of the required power output, avoiding the problem that conventional assembled toys have limitations in assembly diversity due to the power being output from two opposite ends, improving the diversity of assembly of the assembled robot toy in this embodiment, stimulating children's imagination and creativity in assembly, and increasing the fun of the toy. Moreover, by utilizing the solar panel, when the user places the assembled robot toy in this embodiment under sunlight, the solar panel can be used for converting light energy into electrical energy and then transmitting the electrical energy to the motor. The motor is driven based on the current, and in conjunction with the assembly component, the gear box and the head part can be driven to move.

BRIEF DESCRIPTION OF THE DRAWINGS

Implementations of the present disclosure will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present disclosure.

DETAILED DESCRIPTION OF THE EMBODIMENTS

Figure 1:
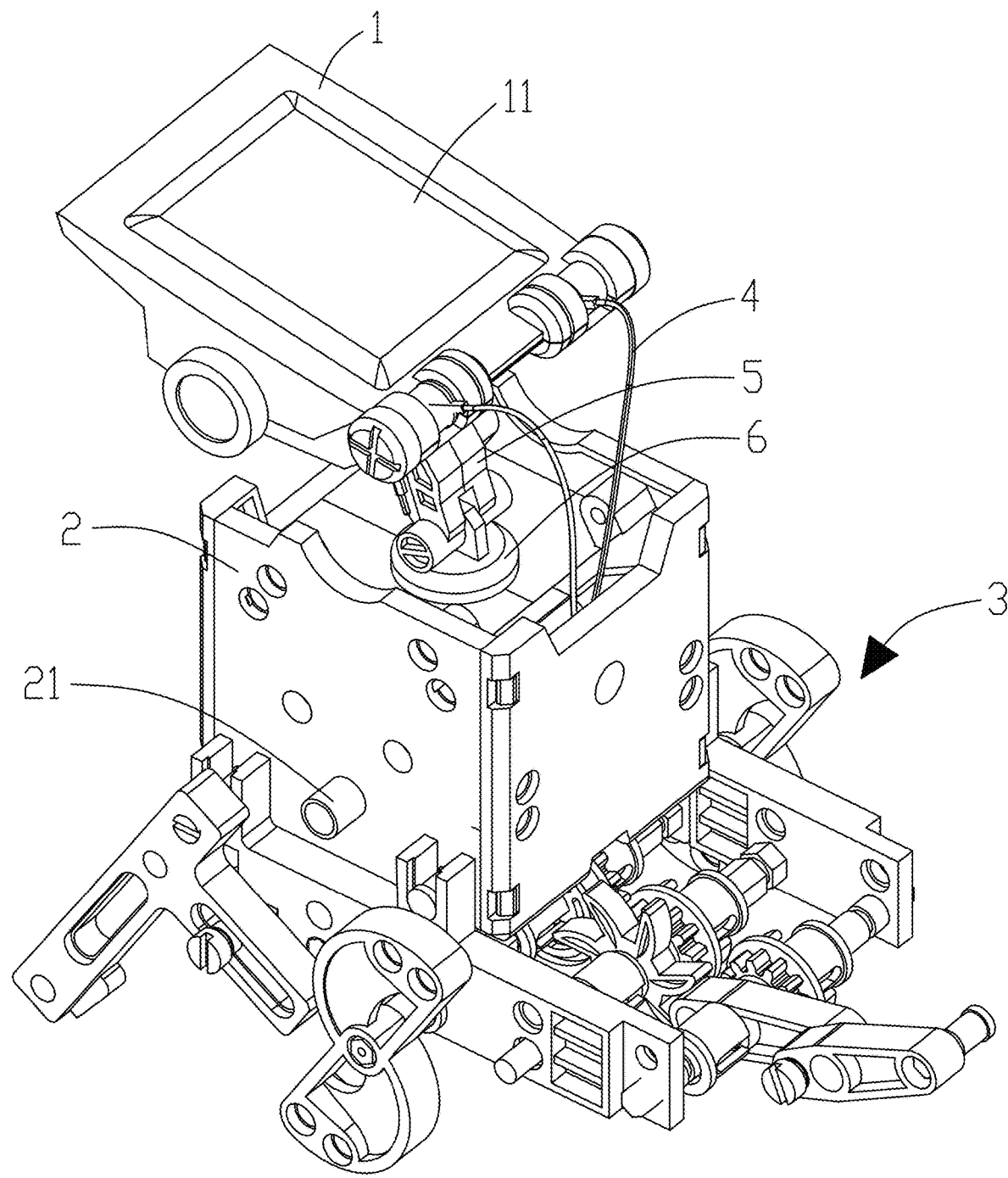
FIG. 1 is a perspective view of the present disclosure.
Figure 2:
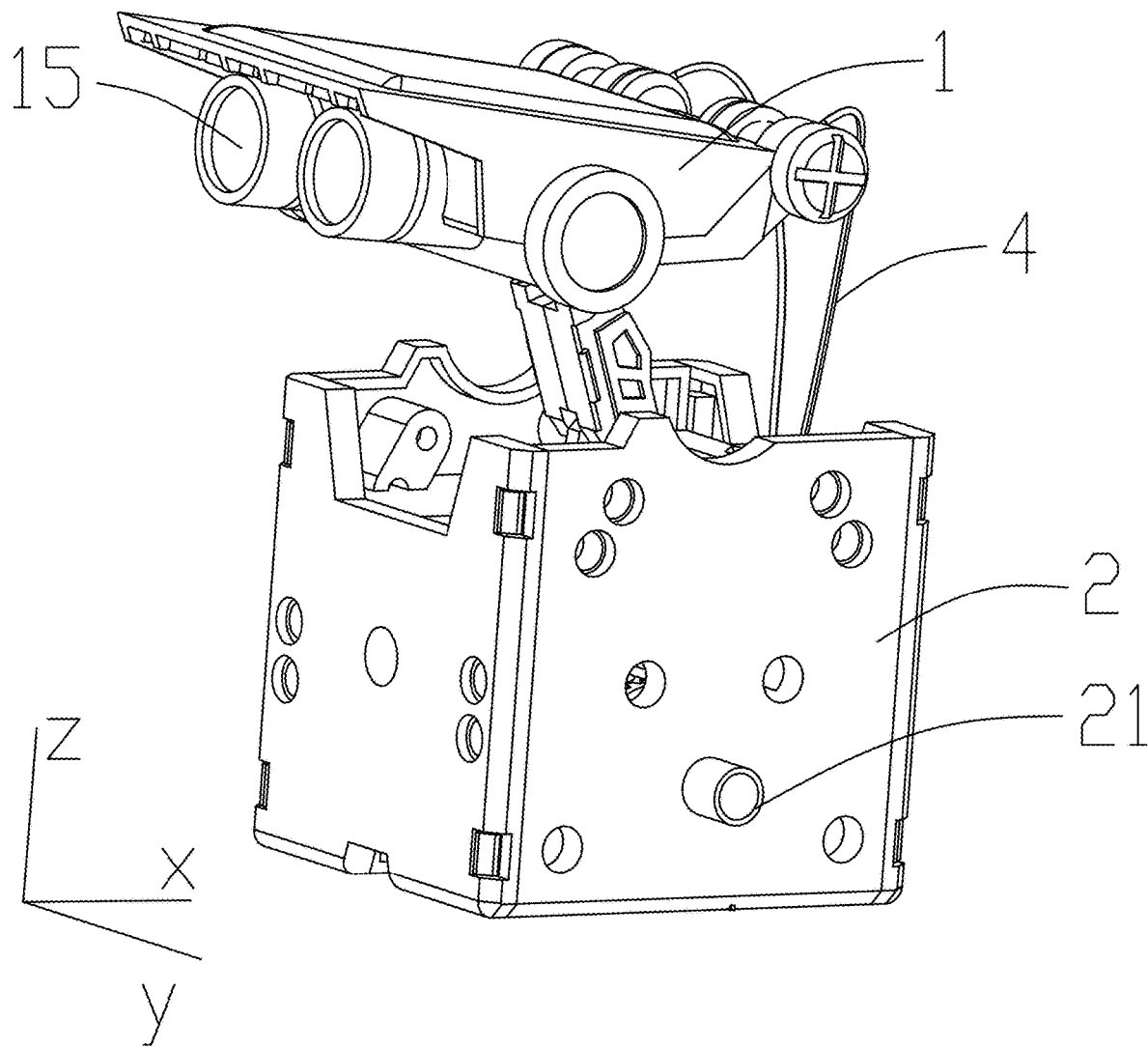
FIG. 2 is a schematic diagram of a head part positioned on a top portion of a gear box in the present disclosure.
Figure 3:
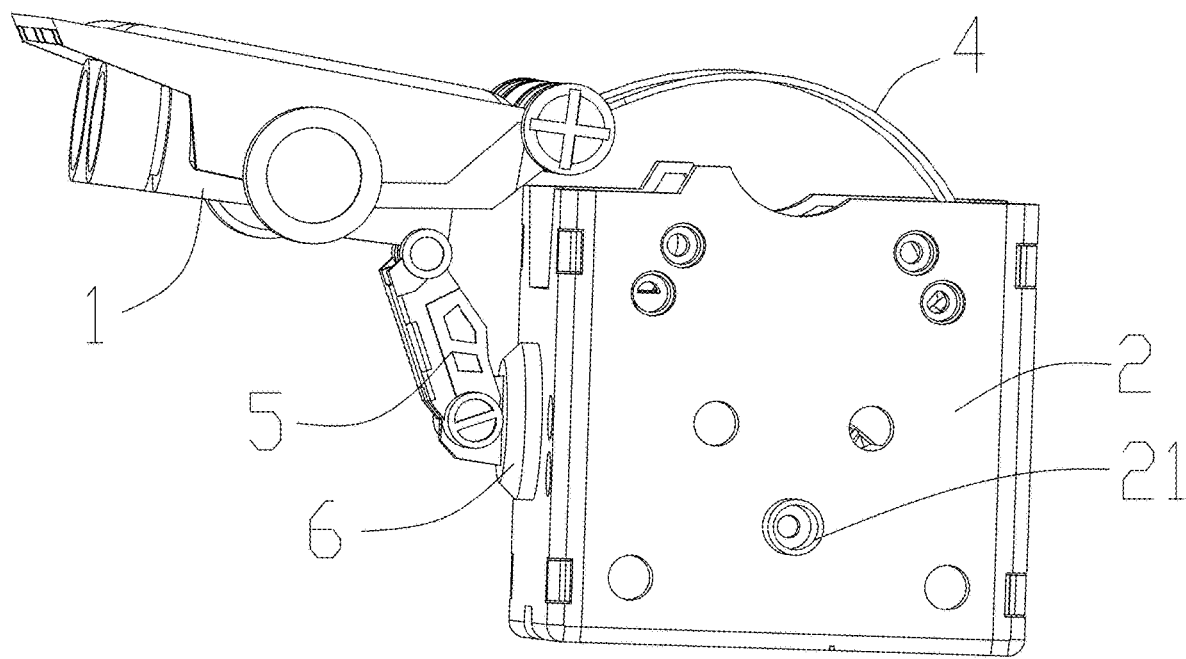
FIG. 3 is a schematic diagram of a head part positioned at a front end of a gear box in the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Referring to FIG. 1 to FIG. 50, an assembled robot toy is disclosed in the embodiment of the present disclosure.

Figure 9:
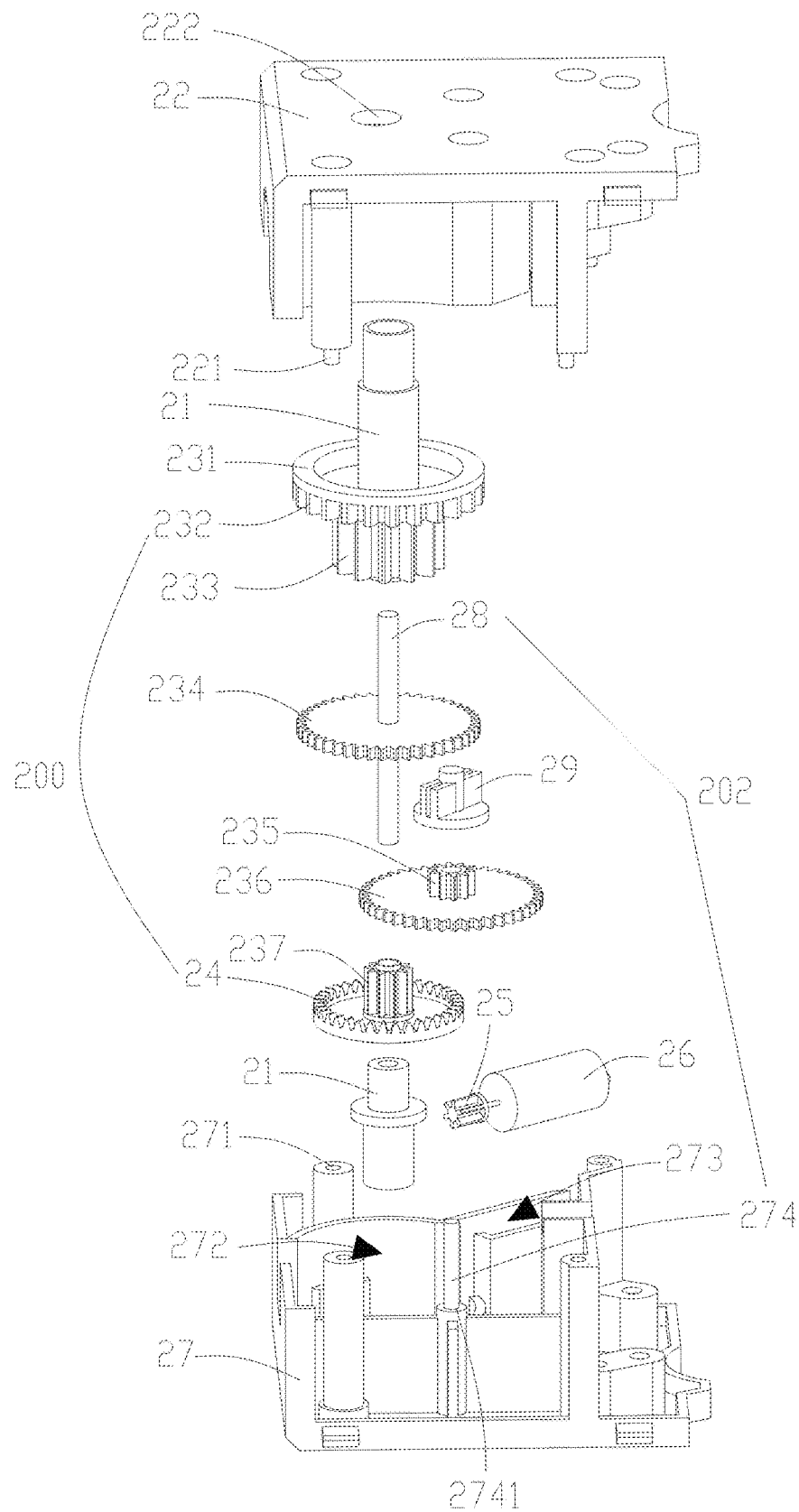
FIG. 9 is an exploded view of a gear box without a reinforcing cover plate in the present disclosure.
Figure 10:
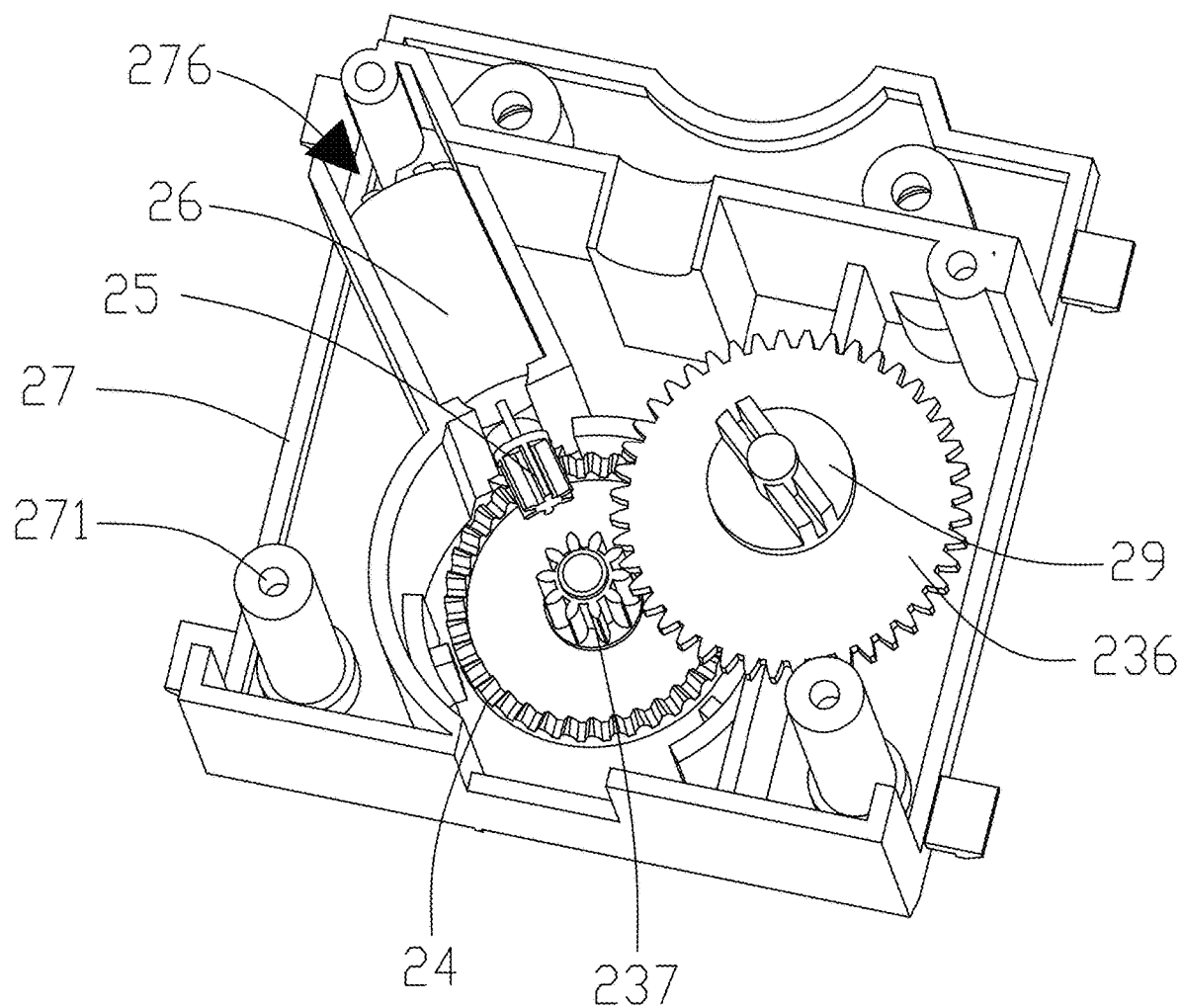
FIG. 10 is an assembly diagram of a motor and part of a transmission gear set mounted on a second shell in the present disclosure.
Figure 11:
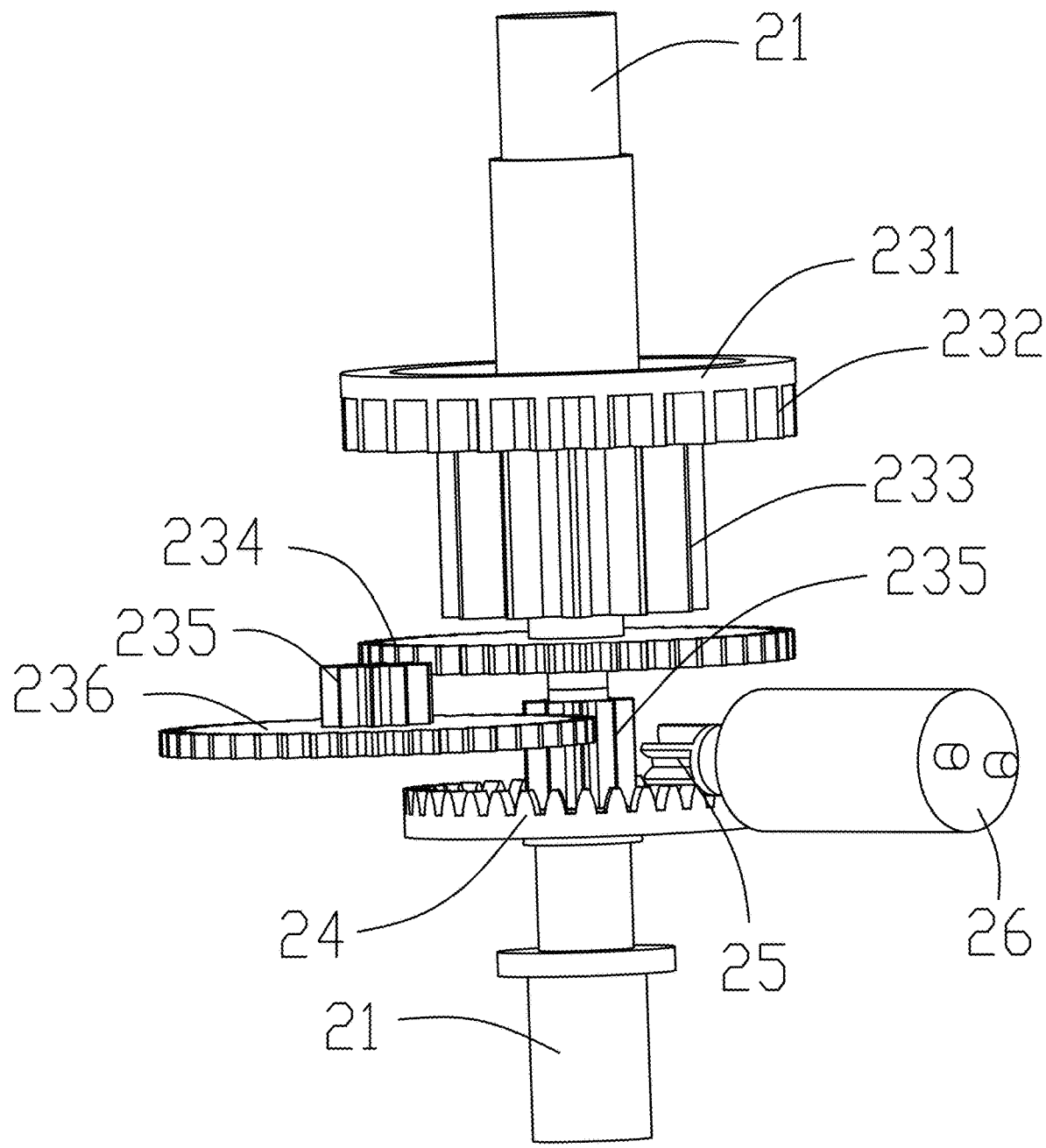
FIG. 11 is an assembly diagram of a gear box without a first shell and a second shell in the present disclosure.
Figure 12:
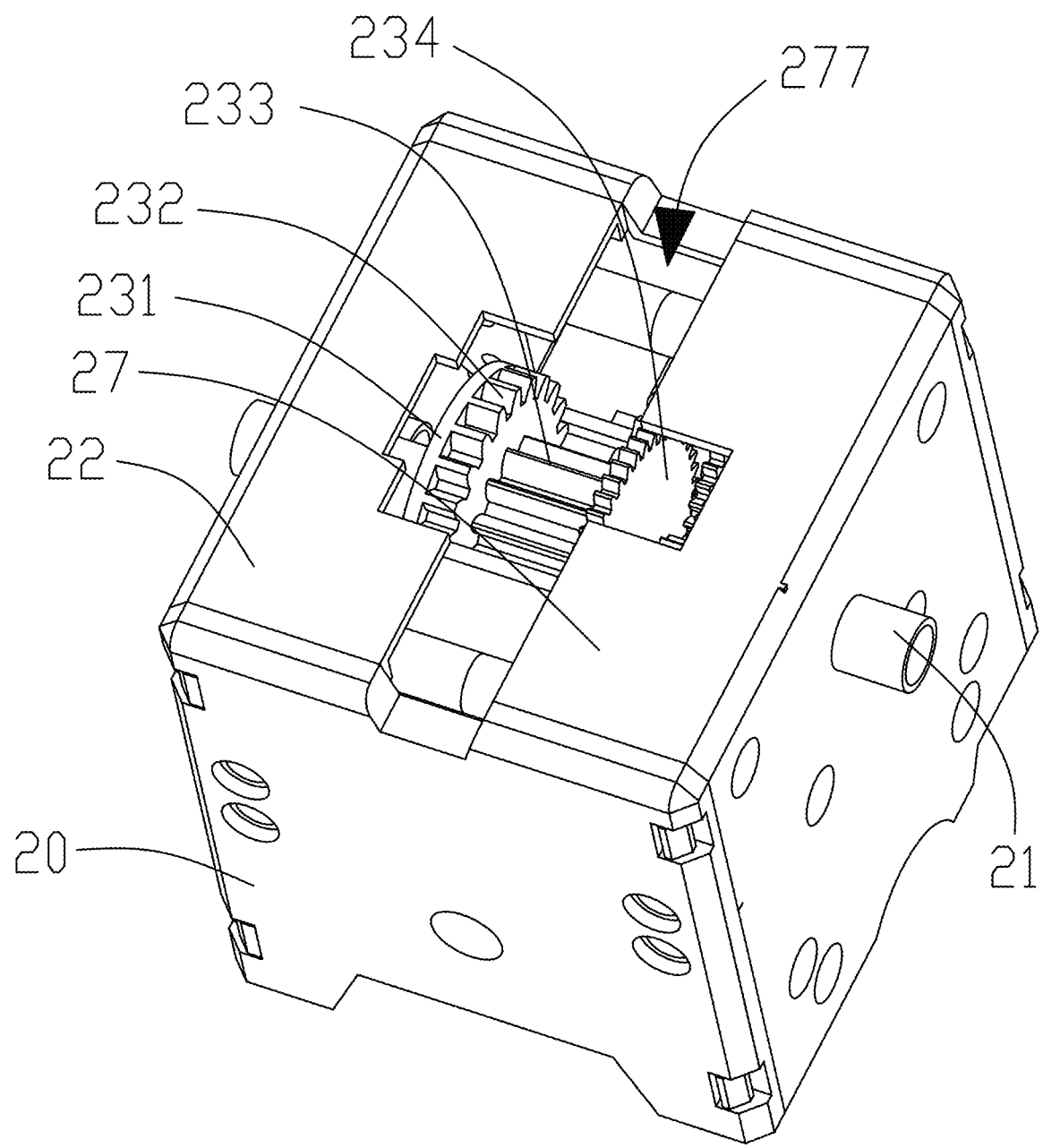
FIG. 12 is a schematic diagram of a gear box in the present disclosure.

Referring to FIG. 1 and FIG. 9, the assembled robot toy includes a power supply module 11, a gear box 2, a rod component 202, a head part 1 and an assembly component 3. The head part 1 and the assembly component 3 are detachably arranged on the gear box 2. The gear box 2 includes a motor 26, a first gear 25, and a transmission gear set 200. The power supply module 11 is electrically connected to the motor 26 and used for supplying power to the motor 26. The first gear 25 is arranged on a rotating shaft of the motor 26. The transmission gear set 200 includes a second gear 24 that meshes with the first gear 25. A total number of teeth of the first gear 25 is less than a total number of teeth of the second gear 24. The rod component 202 is connected to the second gear 24, and the assembly component 3 is connected to the transmission gear set 200 and/or the rod component 202. The rod component 202 is configured for rotating through the transmission of the first gear 25 and the transmission gear set 200 when the motor 26 is driven, and at least one part of the assembly component 3 is configured for moving and driving the transmission gear box 2 and the head part 1 to move when the transmission gear set 200 and/or the rod component 202 rotate. The power supply module 11 includes a solar panel for converting light energy into electrical energy, and the solar panel is electrically connected to the motor 26.

In this embodiment, the head part 1 and the assembly component 3 are detachably configured on the gear box 2. The head part 1 is used as the head of the robot, the assembly component 3 is a part of the toy shape, and the rod component 202 and the transmission gear set 200 are used for power outputs. In this way, a user can assemble the assembly component 3 according to the position of the required power output, avoiding the problem that conventional assembled toys have limitations in assembly diversity due to the power being output from two opposite ends, improving the assembly diversity of the assembled robot toy in this embodiment, stimulating children's imagination and creativity in assembly, and increasing the fun of the toy. Moreover, by utilizing the solar panel, when the user places the assembled robot toy in this embodiment under sunlight, the solar panel can be used for converting light energy into electrical energy and then transmitting the electrical energy to the motor 26. The motor 26 is driven based on the current, and in conjunction with the assembly component 3, the gear box 2 and the head part 1 can be driven to move.

The power supply module 11 can be externally installed on the assembled robot toy in this embodiment, or the solar panel can be set on one component of the head part 1, the assembly component 3, and the gear box 2.

In one embodiment, the solar panel is used for converting light energy into electrical energy and transmitting the electrical energy to the motor 26. The motor 26 is configured for receiving the electrical energy transmitted by the solar panel and being driven, that is, when the toy in this embodiment is not placed under the sun, there is no electrical energy to drive the motor 26 to work, that is, the motor 26 does not work.

In one embodiment, referring to FIGS. 8-11, specifically, the total number of teeth of the first gear 25 is less than the total number of teeth of the second gear 24, which can achieve that a rotational speed of the rod component 202 is less than a rotational speed of the motor 26, so as to control a movement speed of the assembly component 3.

Referring to FIGS. 8-11, in one embodiment, the rod component 202 includes a first rotating rod 28 and a second rotating rod 274. The second gear 24 is arranged on the first rotating rod 28. The transmission gear set 200 includes: a third gear 237 arranged on the first rotating rod 28, a fourth gear 236 and a fifth gear 235 both arranged on the second rotating rod 274, and a sixth gear 234 engaged with the fifth gear 235. The sixth gear 234 is arranged on the first rotating rod 28, the fifth gear 235 is connected to the fourth gear 236, the third gear 237 is engaged with the fourth gear 236, the fifth gear 235 is engaged with the sixth gear 234, a total number of teeth of the sixth gear 234 is greater than a total number of teeth of the fifth gear 235, and a total number of teeth of the third gear 237 is less than a total number of teeth of the fourth gear 236. The first rotating rod 28 rotates through the transmission of the first gear 25 and the second gear 24 when the motor 26 is driven. The third gear 237 is driven to rotate when the first rotating rod 28 rotates, the fourth gear 236 is driven to rotate when the third gear 237 rotates, the fifth gear 235 is driven to rotate when the fourth gear 236 rotates, the sixth gear 234 is driven to rotate when the fifth gear 235 rotates, and the first rotating rod 28 is driven to rotate when the fifth gear 235 rotates. The assembly component 3 is configured for moving when the first rotating rod 28 or the sixth gear 234 rotates, so that the power output by the motor 26 is output from the first rotating rod 28 or the sixth gear 234 to the assembly component 3. The total number of teeth of the fifth gear 235 is less than the total number of teeth of the sixth gear 234. The first rotating rod 28 is connected to the assembly component 3 to further reduce the output speed of the motor 26.

In one embodiment, the transmission gear set 200 further includes a seventh gear 233 and an eighth gear 232. The seventh gear 233 and the eighth gear 232 are arranged on the first rotating rod 28. The seventh gear 233 is a spur gear, and the eighth gear 232 is a spur gear. The gear box 2 is provided with a first avoidance hole 277 at the position corresponding to the seventh gear 233 and the eighth gear 232. The seventh gear 233 and the eighth gear 232 are both driven to rotate when the first rotating rod 28 rotates. The assembly component 3 is connected to one or more of the first rotating rod 28, the seventh gear 233, and the eighth gear 232. By using the first avoidance hole 277, it is convenient for the seventh gear 233 and the eighth gear 232 to respectively connect with the assembly component 3, so as to output the power of the motor 26. A diameter of the seventh gear 233 is smaller than a diameter of the eighth gear 232, so that the user can assemble different shapes according to the assembly component 3.

In one embodiment, the rod component 202 further includes a plurality of transmission rods 21 connected to the assembly component 3, and at least two transmission rods 21 are disposed at both ends of the first rotating rod 28. The transmission rod 21 connected to the first rotating rod 28 is at least partially extended into the gear box 2. The gear box 2 is provided with a second avoidance hole 222 at the position corresponding to the transmission rod 21. By using the transmission rods 21 positioned at both ends of the first rotating rod 28, the power of the motor can be output from both sides of the gear box 2. Specifically, in this embodiment, the second avoidance hole 222 and the first avoidance hole 277 are positioned on two different side surfaces of the gear box 2, respectively.

In other embodiments, the first rotating rod 28 can also be divided into two unconnected rod bodies, that is, the second gear 24 and the third gear 237 are positioned on an identical rod body, and the fourth gear 236 and the fifth gear 235 are positioned on the other rod body. Whether or not the second gear 24, the third gear 237, the fourth gear 236, and the fifth gear 235 are positioned on the same rod is not limited herein. In this embodiment, for the convenience of product assembly and production, the first rotating rod 28 is a continuous rod. The second gear 24, the third gear 237, the fourth gear 236, and the fifth gear 235 are all positioned on the first rotating rod 28.

In one embodiment, the gear box 2 includes a first shell 22 and a second shell 27, and the second shell 27 is detachably connected with the first shell 22 to form a first mounting cavity 273, a second mounting cavity 272 and the second avoidance hole 222. The motor 26 is mounted in the first mounting cavity 273. The transmission gear set 200 is mounted in the second mounting cavity 272. A wiring hole 276 communicated with the first mounting cavity 273 is formed in the first shell 22 and/or the second shell 27. The first shell 22 and the second shell 27 are detachable, so that the transmission gear set 200, the motor 26 and the transmission rod 21 can be mounted in the first shell 22 and the second shell 27 so as to complete the assembly of the whole gear box 2. A user can understand the mechanical principle of how to drive the transmission gear set 200 and the transmission rod 21 after the motor 26 is driven, thus expanding the cognition. Moreover, the arrangement of the wiring hole 276 can facilitate the wiring of a wire, electrically connected with the motor 26, of the power supply module 11 in the head part 1, so that the motor 26 is electrically connected with the power supply module 11.

In the above embodiment, a rotating hole 2741 is defined in the second mounting cavity 272. The transmission gear set 200 also includes the second rotating rod 274 and a limit cap 29. One end of the second rotating rod 274 passes through the fourth gear 236 and the fifth gear 235 and then is placed in the rotating hole 2741. The limit cap 29 is disposed at an opposite end of the second rotating rod 274. The seventh gear 233 is positioned between the fourth gear 236 and the limit cap 29. Therefore, during the assembly of the assembled robot toy in this embodiment, one end of the second rotating rod 274 can be placed in the rotating hole 2741 and the motor 26 can be placed in the first mounting cavity 273. Then, the independent transmission rod 21 can be placed in the second avoidance hole 222, and then one end of the first rotating rod 28 can be inserted into the middle of the transmission rod 21. Then, sequentially, a first injection molded part sleeves the first rotating rod 28, a third injection molded part sleeves the second rotating rod 274, the sixth gear 234 sleeves the first rotating rod 28, the limit cap 29 is plugged at one end of the second rotating rod 274 away from the rotating hole 2741, and the second injection molded part sleeves the first rotating rod 28. By using the second gear 24, the fourth gear 236, the sixth gear 234, and the limit cap 29 to limit each other, the second rotating rod 274 can be limited within the rotating hole 2741 to cooperate with the connection of the first shell 22 and the second shell 27. After the two transmission rods 21 pass through the second avoidance hole 222, the entire transmission gear set 200 and the motor 26 are fully limited, achieving the installation of the gear box 2.

Figure 13:
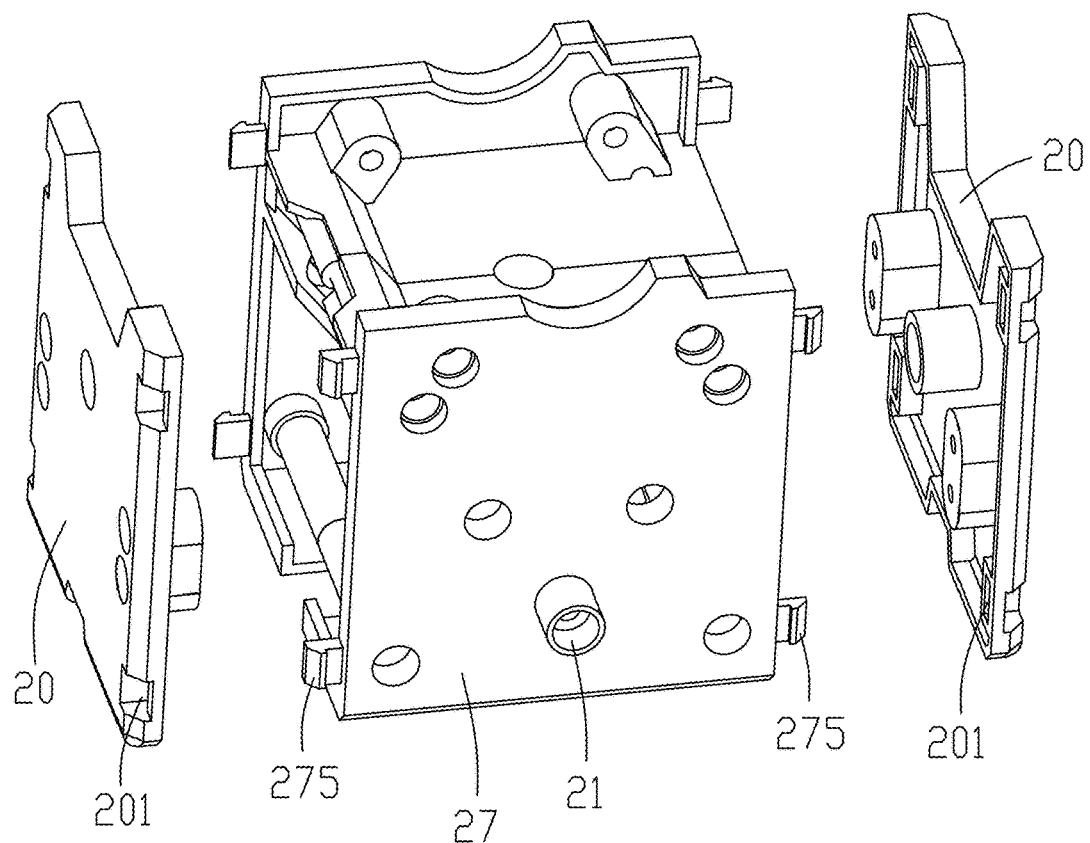
FIG. 13 is a partially exploded view of a gear box in the present disclosure.
Figure 14:
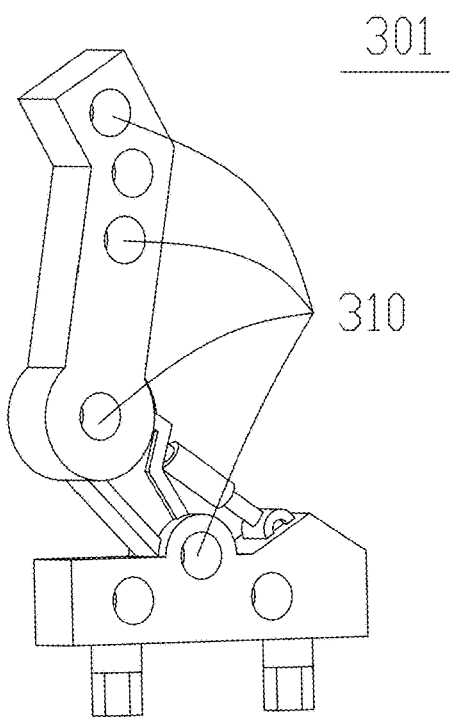
FIG. 14 is a schematic diagram of a force arm connecting rod in the present disclosure.
Figure 15:
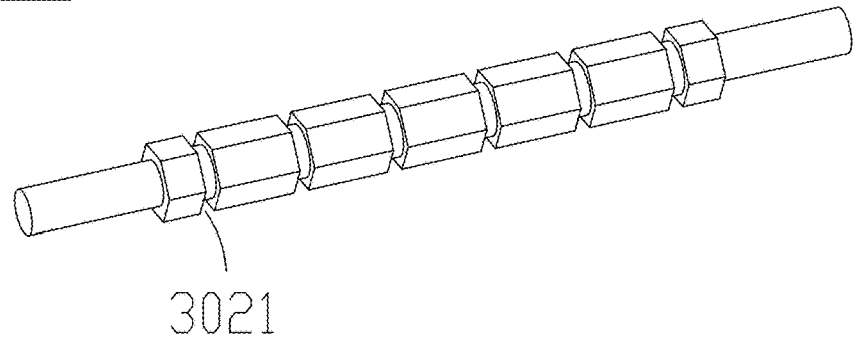
FIG. 15 is a schematic diagram of a third rotating rod in the present disclosure.
Figure 16:
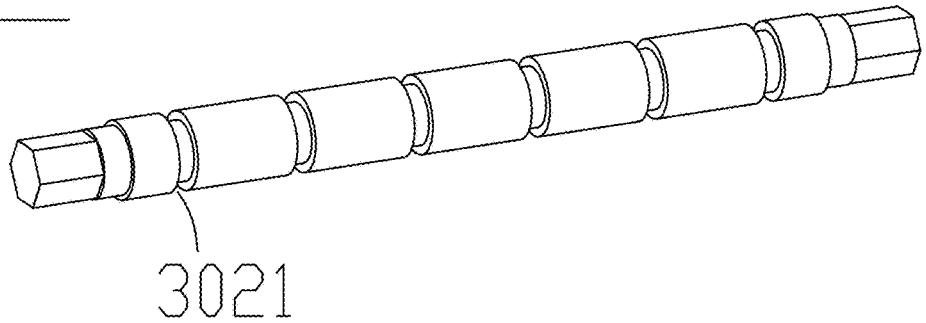
FIG. 16 is a schematic diagram of a fixed rod in the present disclosure.
Figure 17:
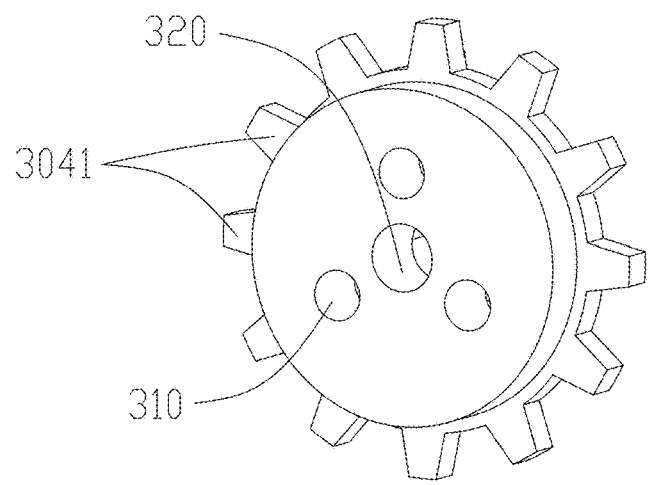
FIG. 17 is a structural diagram of a second cam in the present disclosure.
Figure 18:
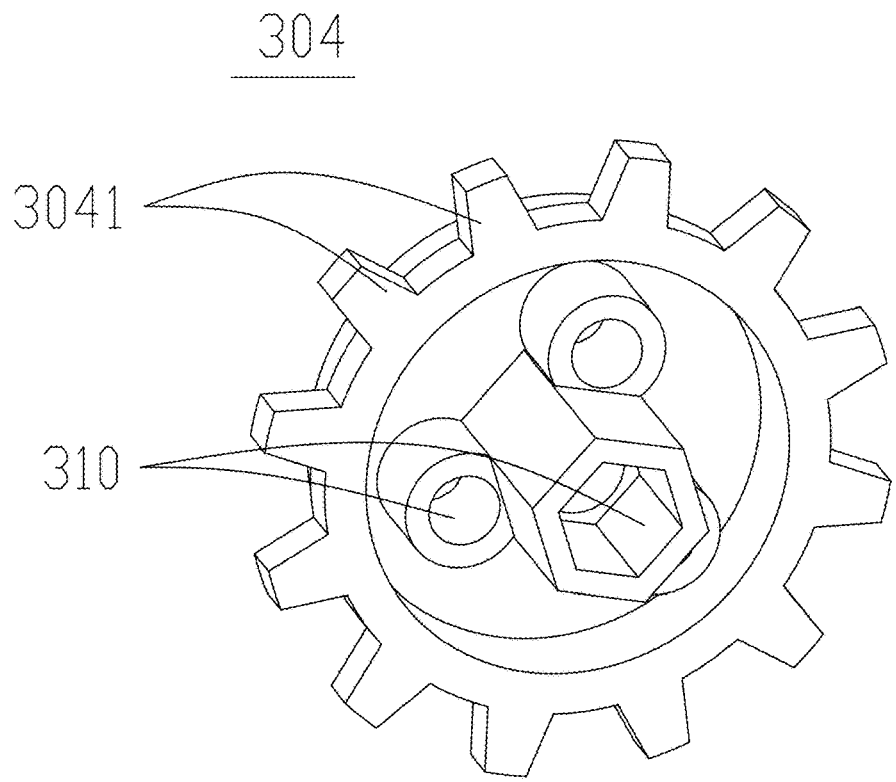
FIG. 18 is a structural diagram of a second cam in the present disclosure from another angle of view.
Figure 19:
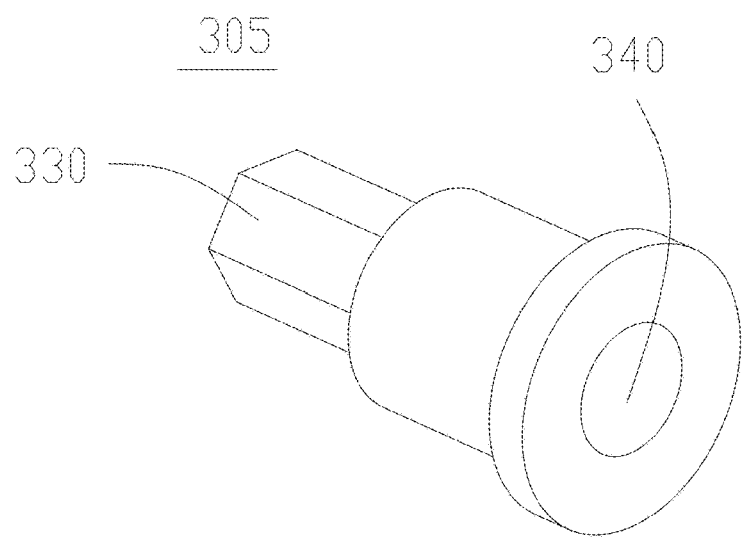
FIG. 19 is a schematic diagram of a switch part in the present disclosure.
Figure 20:
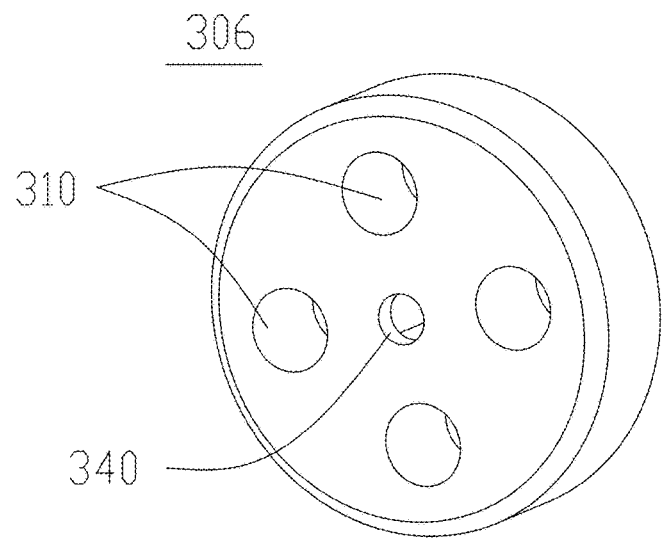
FIG. 20 is a structural diagram of a first cam in the present disclosure.
Figure 21:
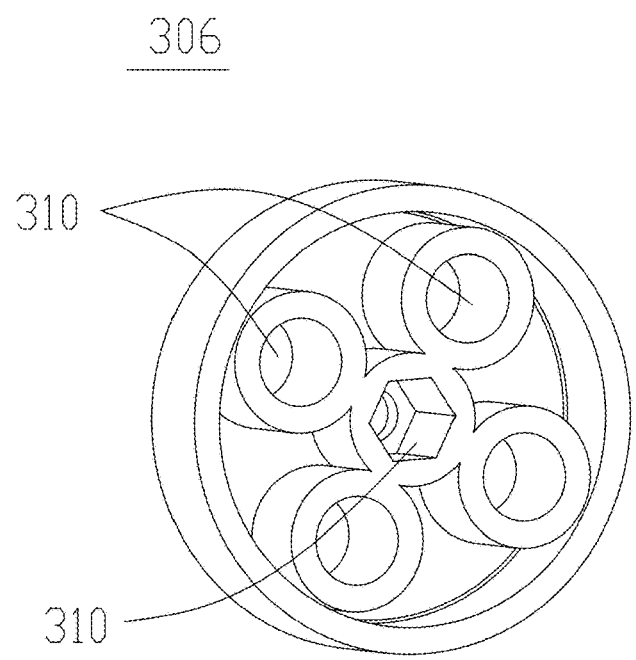
FIG. 21 is a structural diagram of a first cam in the present disclosure from another angle of view.
Figure 22:
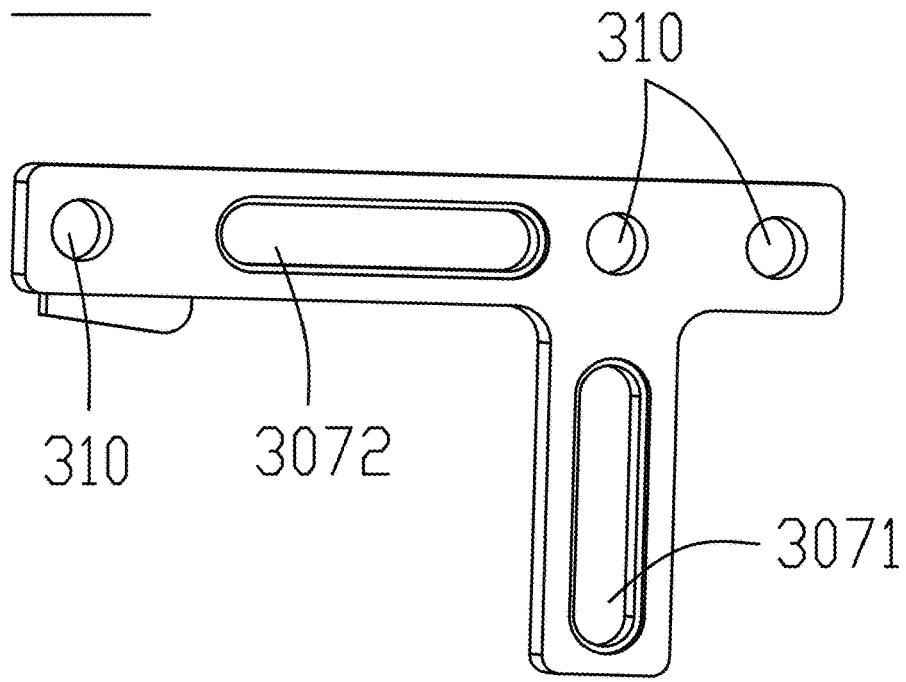
FIG. 22 is a schematic diagram of a T-shaped connecting rod in the present disclosure.
Figure 23:
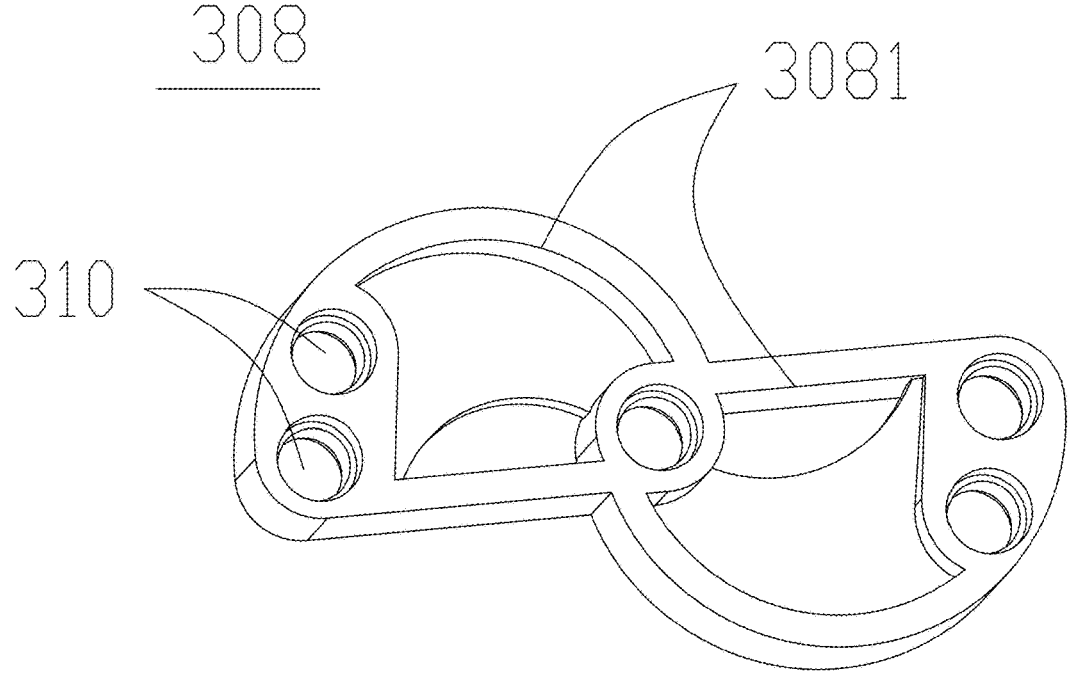
FIG. 23 is a schematic diagram of a symmetrical semi-circular piece in the present disclosure.
Figure 24:
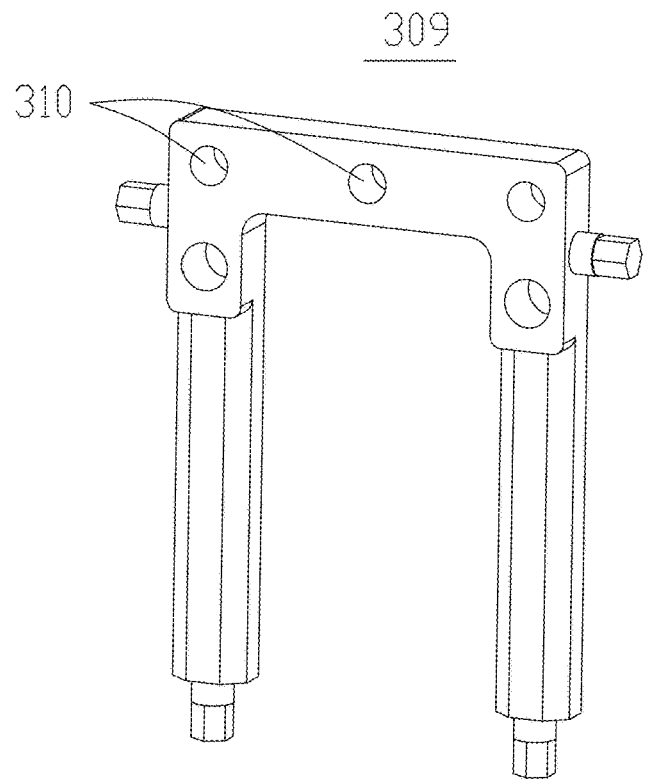
FIG. 24 is a schematic diagram of a U-shaped piece in the present disclosure.
Figure 25:
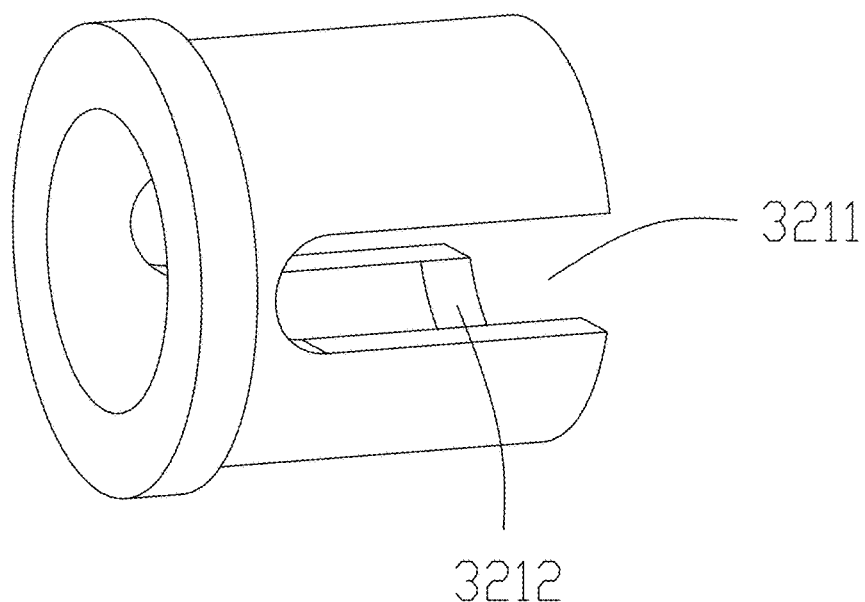
FIG. 25 is a schematic diagram of a fixed sleeve in the present disclosure.
Figure 26:
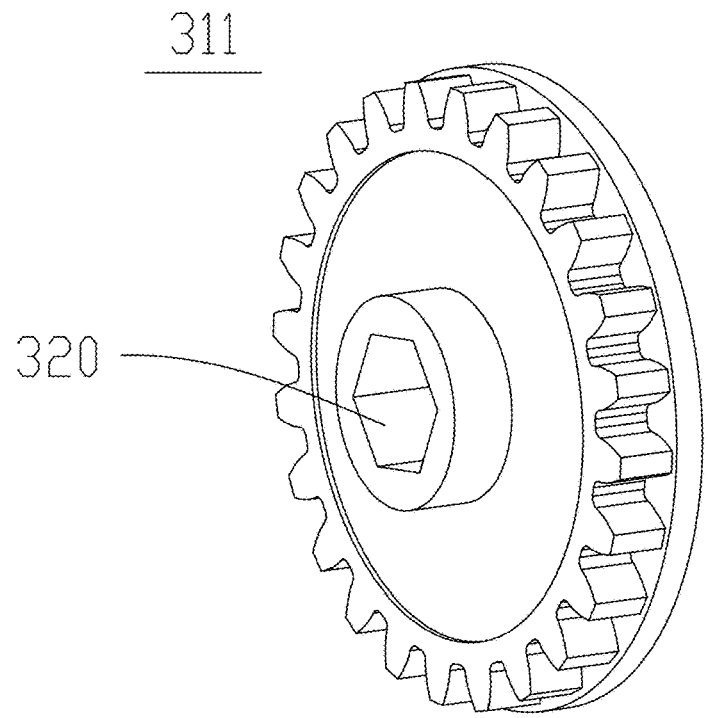
FIG. 26 is a schematic diagram of an accessory spur gear in the present disclosure.
Figure 27:
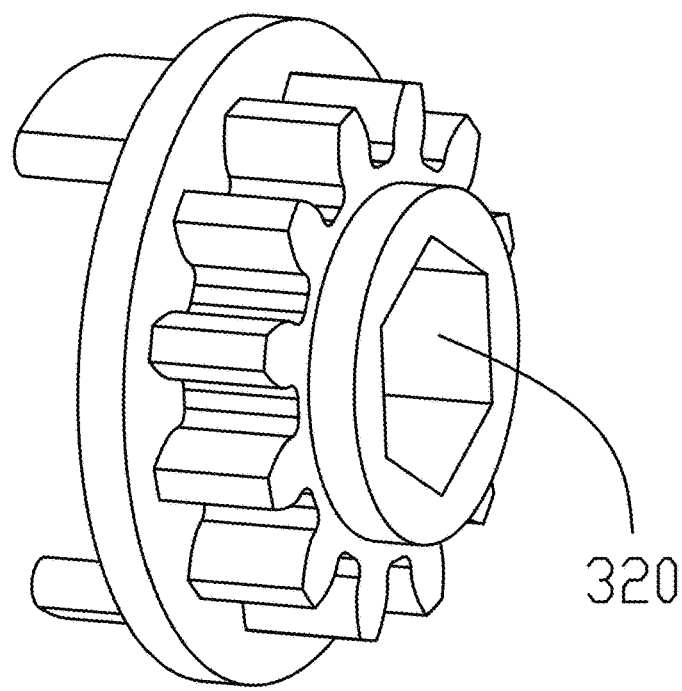
FIG. 27 is a schematic diagram of an accessory spur gear in the present disclosure from another angle of view.
Figure 28:
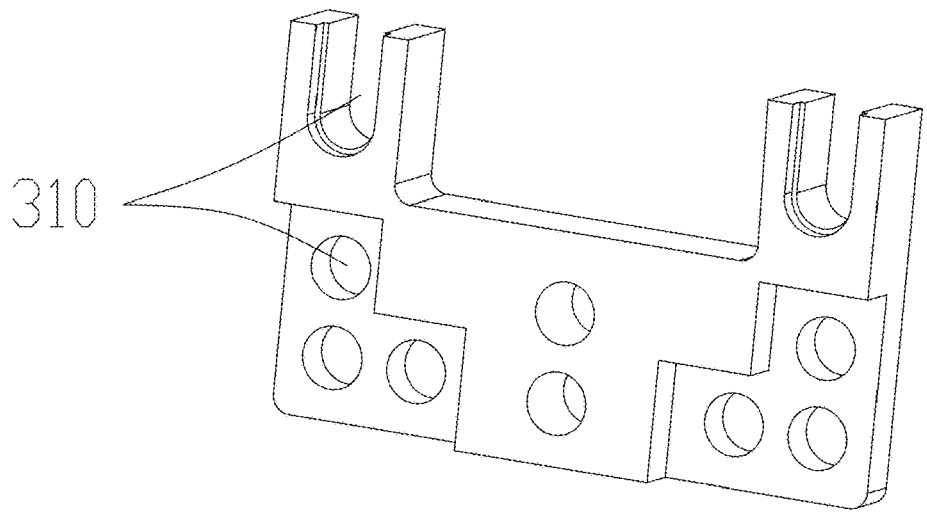
FIG. 28 is a schematic diagram of a fixed plate in the present disclosure.
Figure 29:
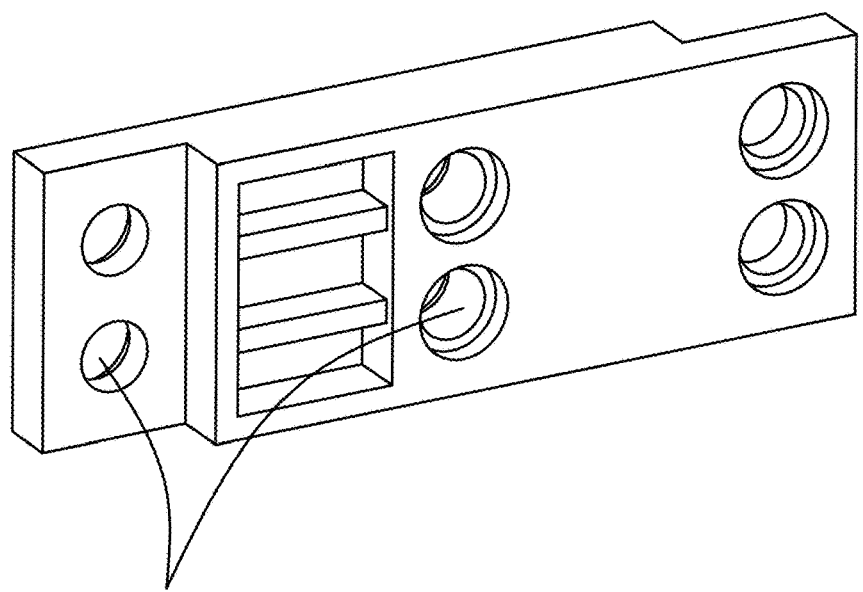
FIG. 29 is a schematic diagram of a connecting plate in the present disclosure.
Figure 30:
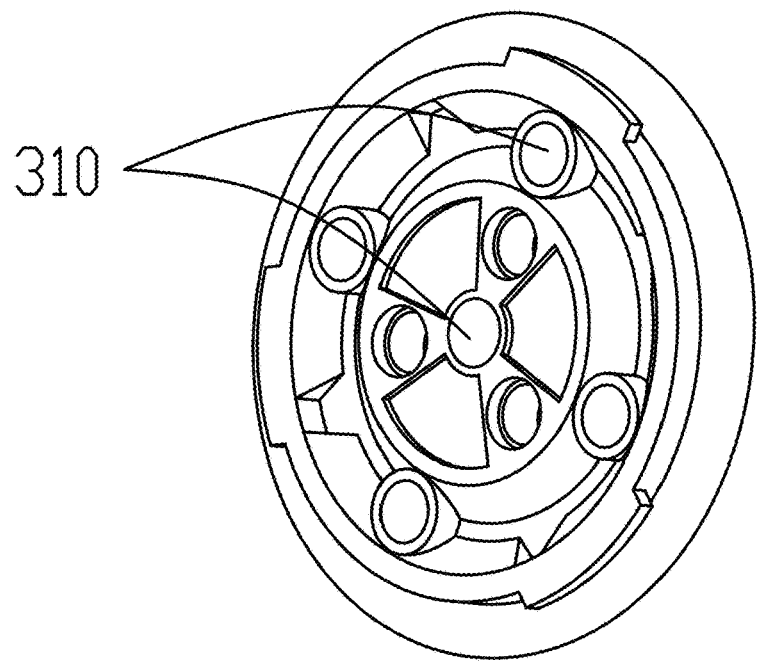
FIG. 30 is a schematic diagram of a wheel in the present disclosure.
Figure 31:
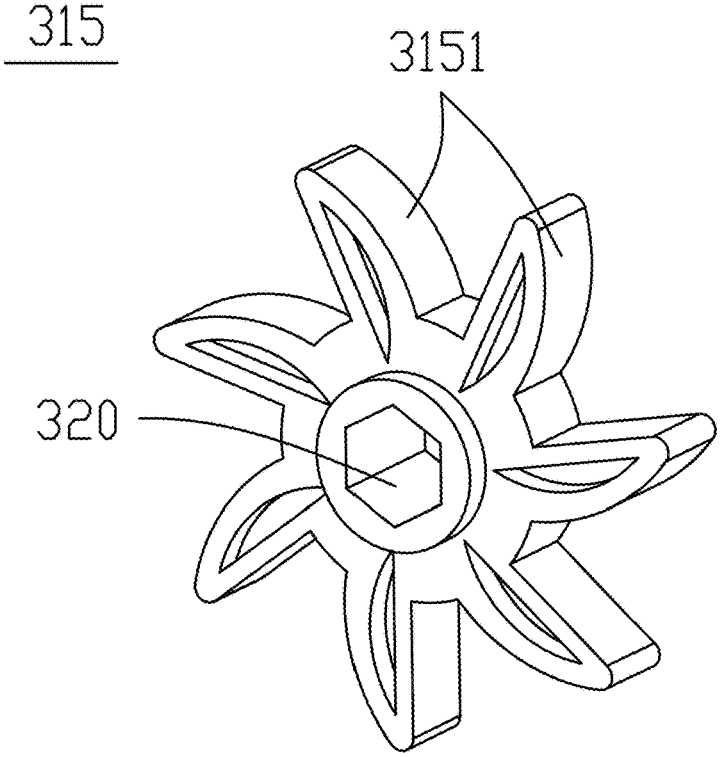
FIG. 31 is a schematic diagram of a fluctuating gear in the present disclosure.
Figure 32:
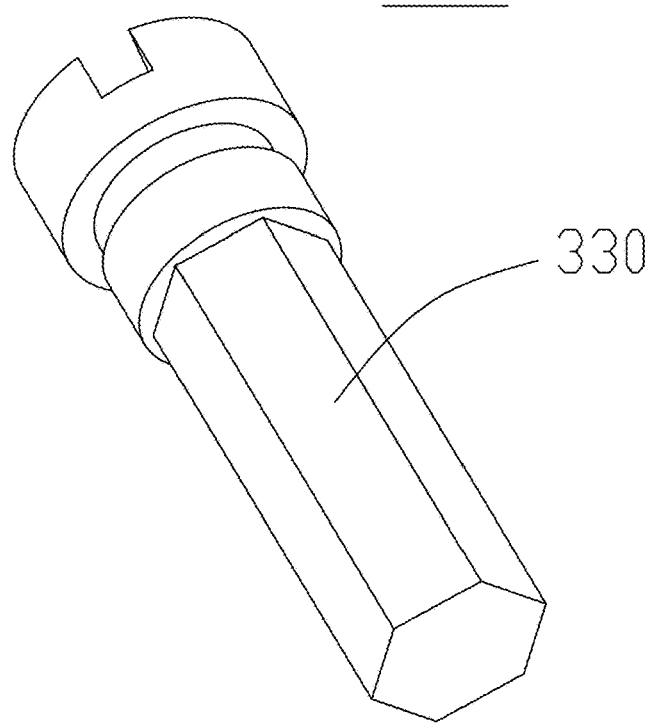
FIG. 32 is a schematic diagram of a bolt in the present disclosure.
Figure 33:
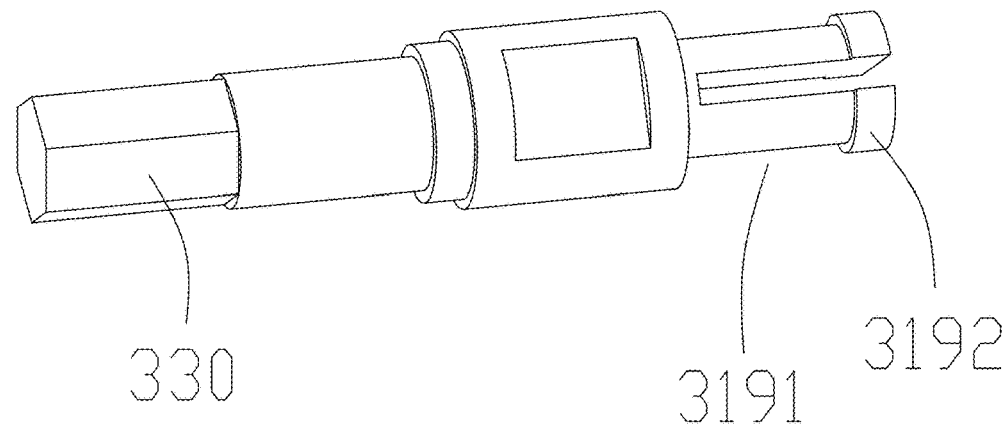
FIG. 33 is a schematic diagram of another bolt of the present disclosure.
Figure 34:
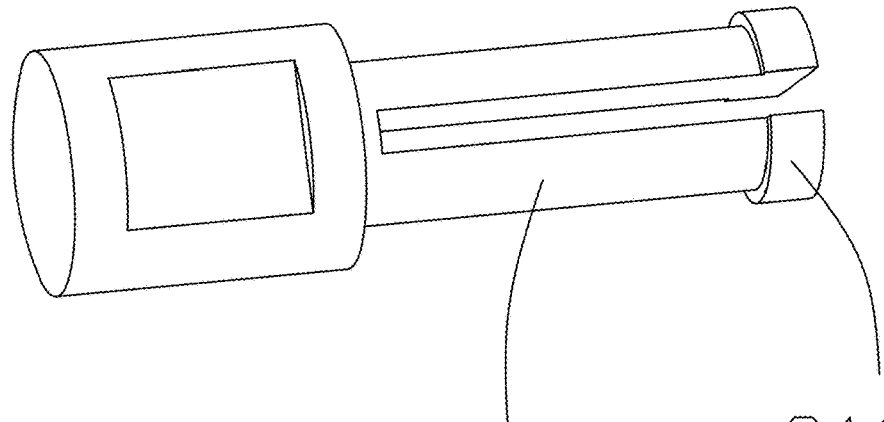
FIG. 34 is a schematic diagram of another bolt of the present disclosure.
Figure 35:
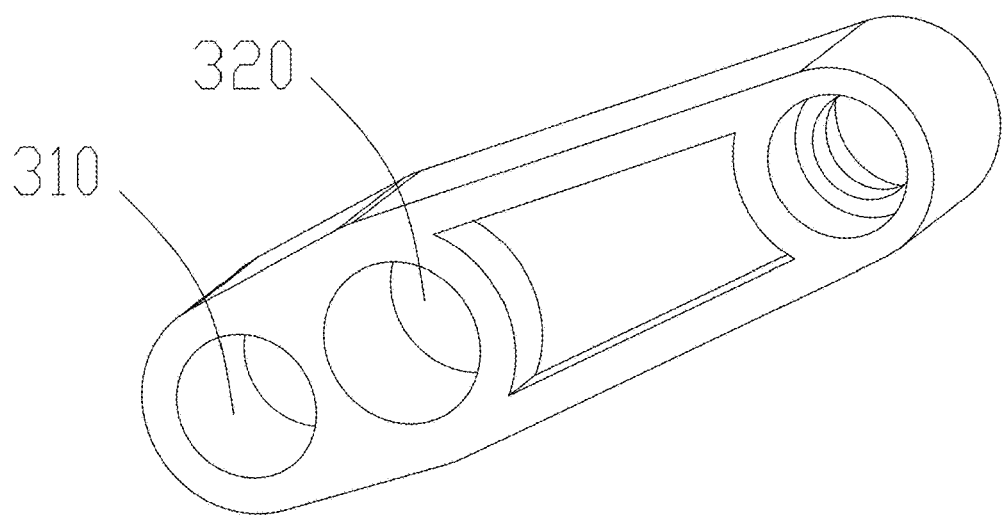
FIG. 35 is a schematic diagram of a straight-line connecting rod in the present disclosure.
Figure 36:
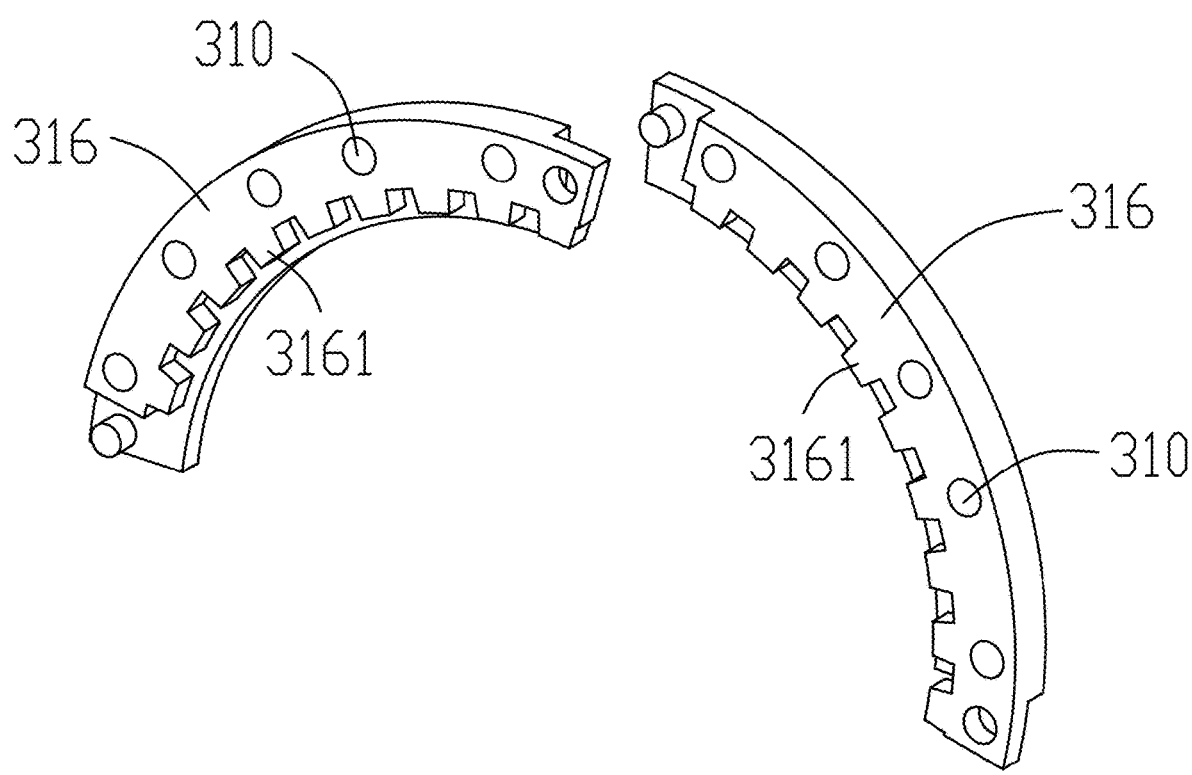
FIG. 36 is an exploded view of two arc-shaped connecting rods in the present disclosure.

In one embodiment, referring to FIG. 13, the first shell 22 protrudes on one side opposite to the second shell 27 to form a plurality of first plugging ends 221, a plurality of first plugging grooves 271 are formed in one side, opposite to the first shell 22, of the second shell 27, and the first plugging end 221 is arranged in the first plugging groove 271 so as to connect the first shell 22 and the second shell 27. The gear box 2 also includes a plurality of reinforcing cover plates 20. A plurality of first clamping holes 201 are formed in the reinforcing cover plate 20. A plurality of first clamping buckles 275 are arranged on both sides of the first shell 22 and the second shell 27. The first clamping buckle 275 is clamped with the first clamping hole 201, so that the reinforcing cover plates 20 are fixed on the first shell 22 and the second shell 27. The connection between the first shell 22 and the second shell 27 can be reinforced by the reinforcing cover plate 20, so that the first shell 22 is prevented from being separated from the second shell 27. In the embodiment, the first shell 22 and the second shell 27 are connected in left and right directions, and the number of the reinforcing cover plates 20 in one gear box 2 is two, and the reinforcing cover plates 20 are positioned on the front and rear sides of the gear box 2. In other embodiments, the number of the reinforcing cover plates 20 in one gear box 2 can be four, and the reinforcing cover plates 20 are respectively arranged on four side walls of the gear box 2.

In other embodiments, the first shell 22 can be detachably connected to the second shell 27 directly by means of buckling or screwing, and the connection mode between the first shell 22 and the second shell 27 is not limited herein.

In one embodiment, referring to FIG. 1, the head part 1 is rotatably connected with the gear box 2, and the head part 1 is positioned at one of the top, front and back positions of the gear box 2, so that the diversity of assembly positions of the head part 1 is improved, and the user can adjust the position of the head part 1 according to the assembled assembly component 3, and the creativity of the user for the assembling toy is increased.

Figure 4:
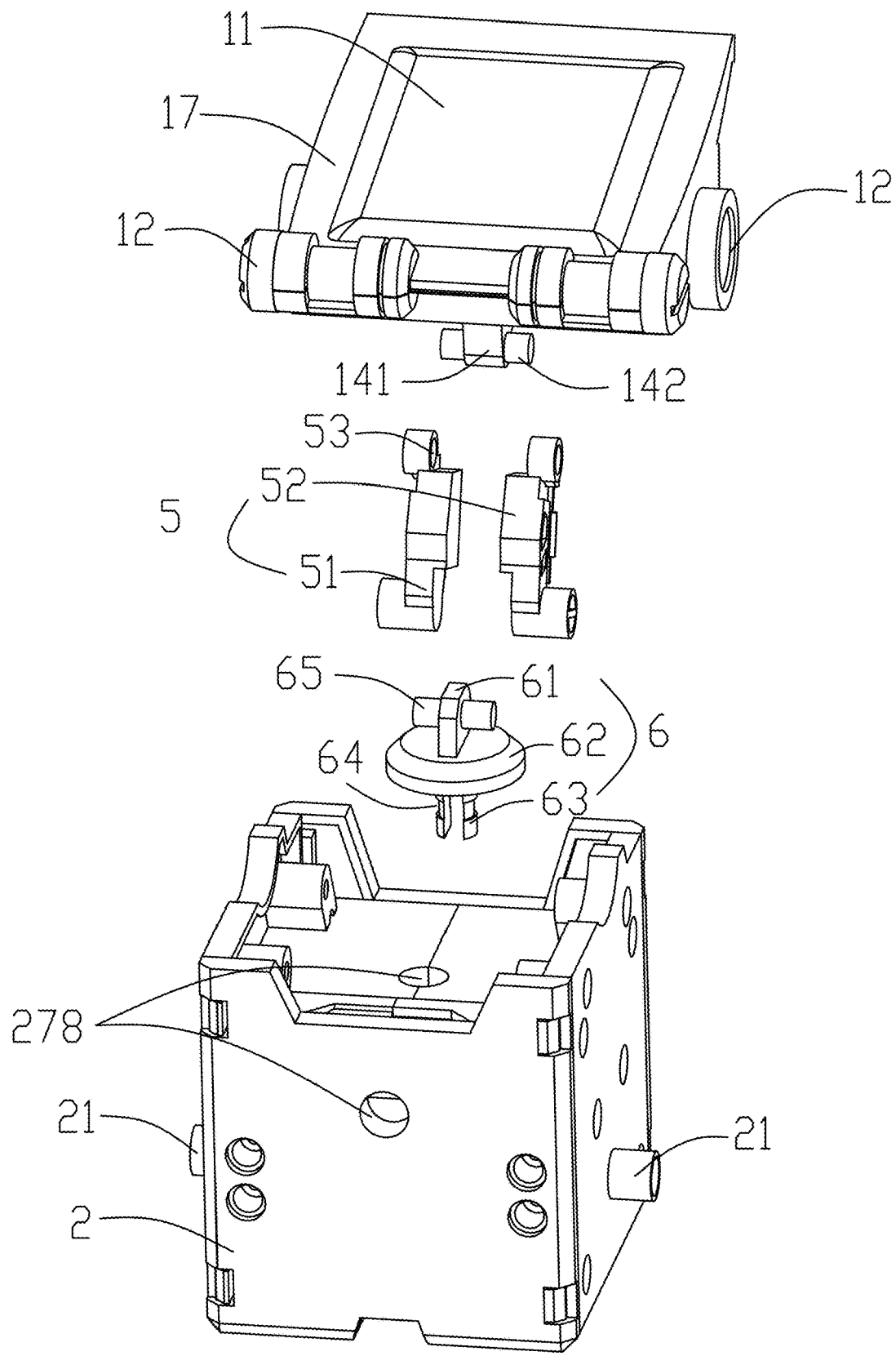
FIG. 4 is a partially exploded view of the present disclosure without an assembly component.

In the above embodiments, referring to FIG. 4, a first connecting rod 6 and a second connecting rod 5 are arranged between the head part 1 and the gear box 2, and the first connecting rod 6 is rotatably connected with the second connecting rod 5. The first connecting rod 6 is configured to drive the head part 1 to rotate along a central axis of the first connecting rod 6 under the action of external force, and the second connecting rod 5 is configured to drive the head part 1 to rotate along a direction perpendicular to the central axis of the first connecting rod 6 under the action of external force. If the head part 1 is mounted on a top surface of the gear box 2, the head part 1 can rotate along the Z axis through the first connecting rod 6, and the head part 1 can rotate along the X axis through the second connecting rod 5. If the head part 1 is mounted on the front side wall of the gear box 2, the head part 1 can rotate along the Y axis through the first connecting rod 6, and the head part 1 can rotate along the X axis through the second connecting rod 5, so that the angle between the head part 1 and the gear box 2 is increased, and the interestingness of the assembled robot toy in the embodiment is increased.

It should be noted that the Z axis is in the direction of upper and lower ends of the gear box 2, the X axis is in the front-and-rear direction of the gear box 2, and the Y axis is in the left-and-right direction of the gear box 2.

Specifically, referring to FIG. 4, the first connecting rod 6 includes a first limit plate 62, a fourth clamping block 64 arranged at the bottom of the first limit plate 62, and a third lug 61 arranged on the top of the first limit plate 62. Both sides of the third lug 61 protrude to form a first rotating part 65, the fourth clamping block 64 is a cylinder, and a circumferential bottom of the cylinder protrudes to form an annular clamping block 63. The bottom of the head part 1 protrudes to form a fourth lug 141. Both sides of the fourth lug 141 protrude to form a second rotating part 142. Head assembly holes 278 are formed in the front and rear side walls and the top surface of the gear box 2 at central positions. The second connecting rod 5 includes a left connecting rod 52 and a right connecting rod 51, and shaft holes 53 are formed in upper and lower ends of the left connecting rod 52 and the right connecting rod. The fourth clamping block 64 is plugged into the head assembly hole 278, and the annular clamping block 63 and the first limit plate 62 are limited at both ends of the head assembly hole 278, so that the first connecting rod 6 is rotatably connected with the gear box 2. The shaft holes 53 in the upper and lower ends of the left connecting rod 52 and the right connecting rod respectively sleeve the second rotating part 142 and the first rotating part 65, and the head part 1 is connected with the first connecting rod 6 through the second connecting rod 5, so that the head part 1 can be rotated in a direction perpendicular to the central axis of the first connecting rod 6 under the action of external force, and the rotating angle of the head part 1 can be convenient for the user to adjust.

Certainly, in other embodiments, the head part 1 can be connected to the gear box 2 through the first connecting rod 6 and the second connecting rod 5 in turn, that is, the head assembly hole 278 is formed in the bottom of the head part 1, and a second clamping block 3212 of the first connecting rod 6 is plugged at the bottom of the head part 1. The fourth lug 141 is arranged on the gear box 2, and the first connecting rod 6 and the gear box 2 are connected through the second connecting rod 5, so that the gear box 2 can rotate in multiple directions. The positional relationship and the structures of the first connecting rod 6 and the second connecting rod 5 are not limited here. For example, the second connecting rod 5 can only include the left connecting rod 52.

Figure 5:
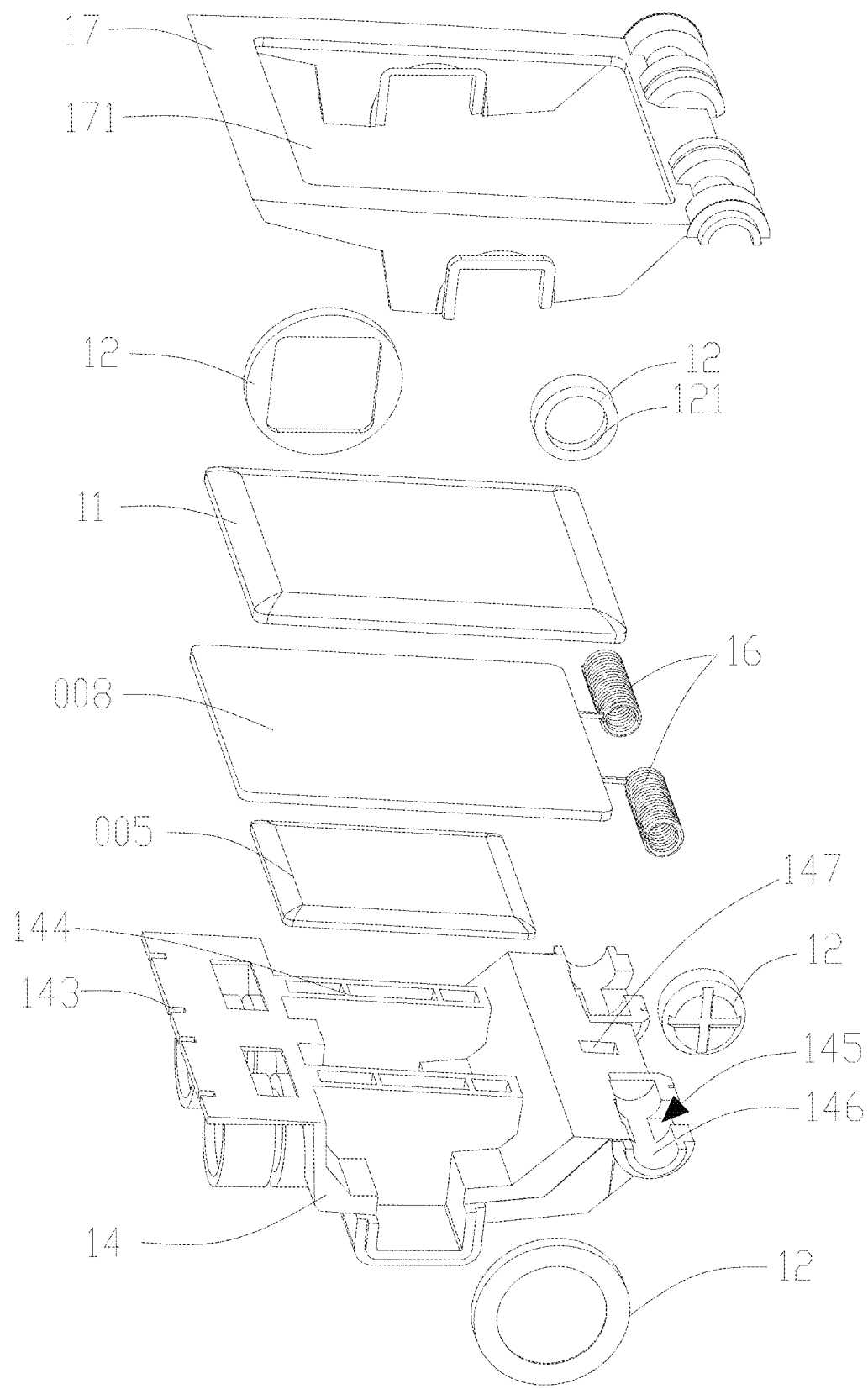
FIG. 5 is an exploded view of a head part in the present disclosure.
Figure 6:
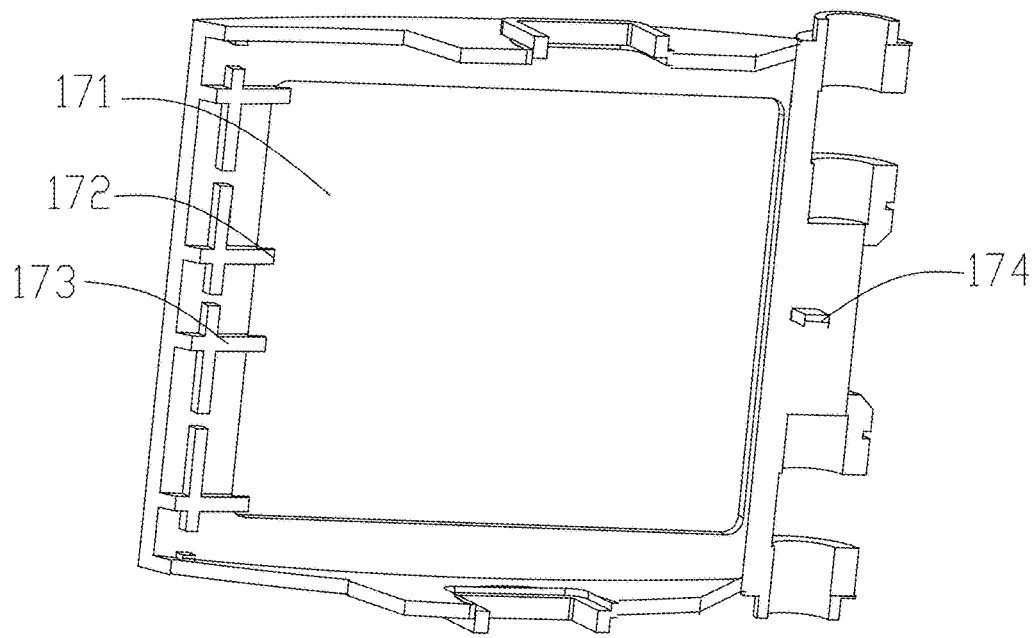
FIG. 6 is a structural diagram of a face shell in the present disclosure.
Figure 7:
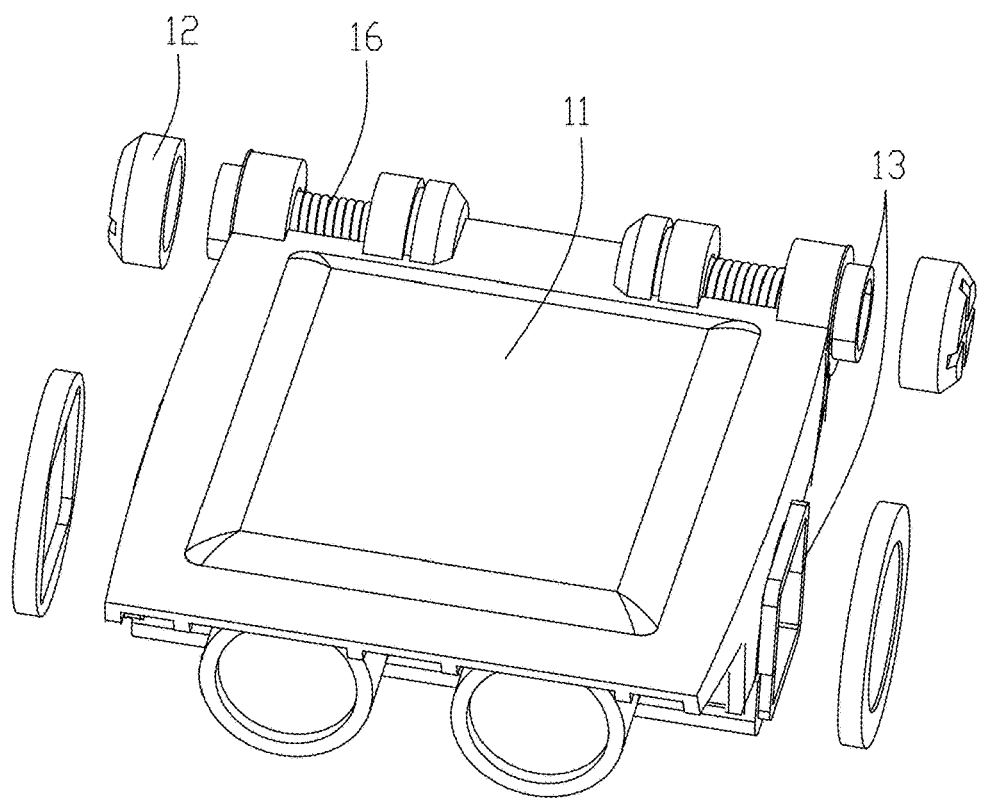
FIG. 7 is a partially exploded view of a head part in the present disclosure.
Figure 8:
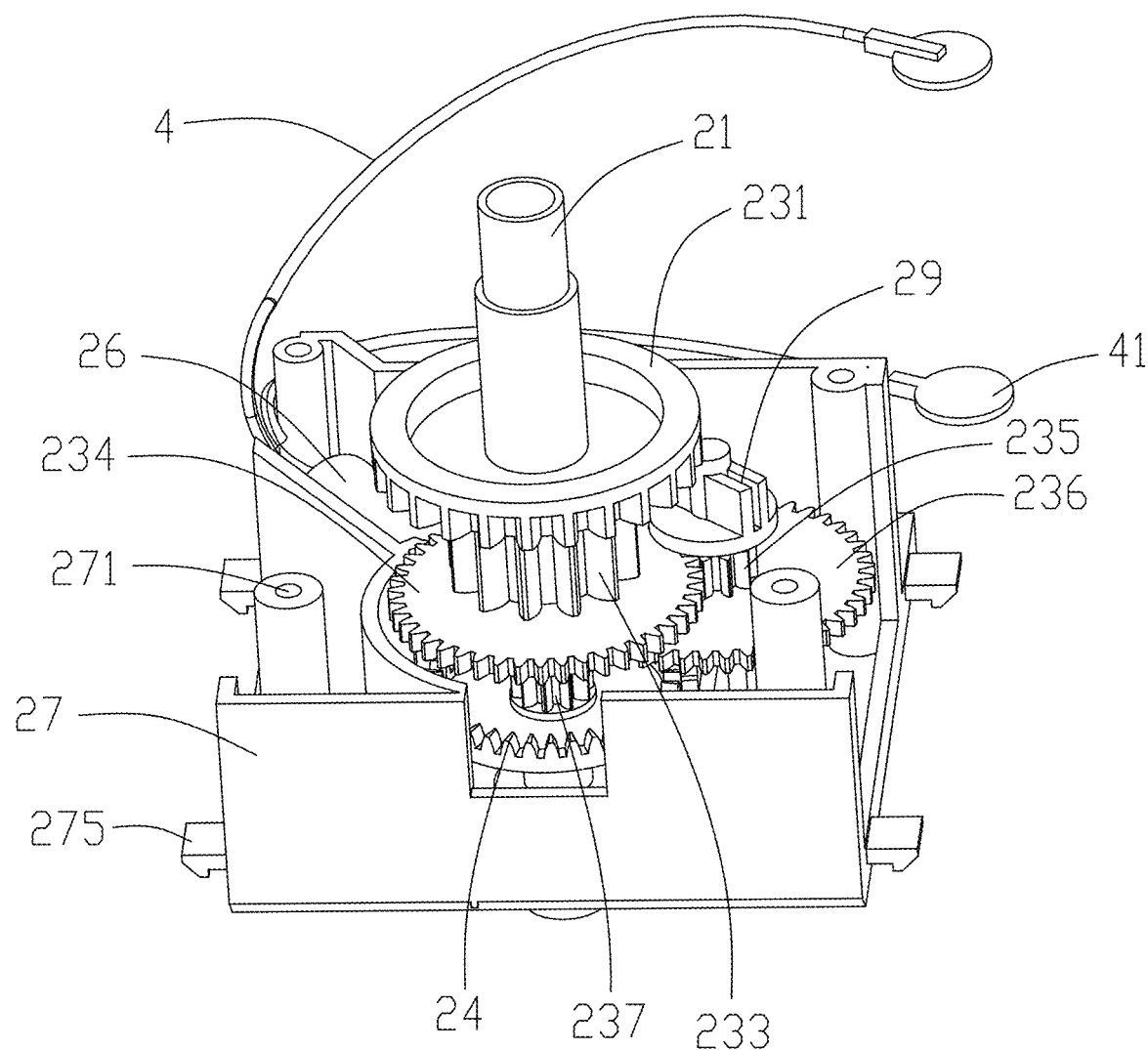
FIG. 8 is an assembly diagram of a transmission gear set, a motor and a transmission rod mounted on a second shell in the present disclosure.

Specifically, in one embodiment, referring to FIG. 5 to FIG. 7, the solar panel is arranged on the head part 1, and the head part 1 includes a bottom shell 14, a face shell 17 which is detachably connected with the bottom shell 14 and forms a third mounting cavity 144 and two fourth mounting cavities 146 with the bottom shell 14, and two conducting springs 16 respectively arranged in the two fourth mounting cavities 146. The two fourth mounting cavities 146 are arranged at intervals and are both communicated with the third mounting cavity 144, and third avoidance holes 145 are formed in the face shell 17 and/or the bottom shell 14 at the positions corresponding to the fourth mounting cavities 145. The solar panel is arranged in the third mounting cavity 144, and a display port 171 is formed in the face shell 17 at the position corresponding to the solar panel, so that the solar panel is irradiated with light energy. The motor 26 is electrically connected with two conducting wires 4, the tail end of the conducting wire 4 is provided with a conducting plate 41, and the conducting plate 41 is plugged in the conducting spring 16. By using the third avoidance hole 145, the conducting plate 41 can be conveniently plugged on the conducting spring 16, and the conducting plate 41 and the conducting spring 16 can be conveniently assembled by the user and electrically connected to the solar panel and the motor 26.

In one embodiment, the conducting spring 16 is integrally welded with the solar panel at the factory. The bottom of one end of the face shell 17 extends downward to form a second plugging end 174, the bottom of an opposite end of the face shell 17 extends downward to form a plurality of first stop blocks 173 arranged at intervals, and the first stop block 173 protrudes at the bottom of one side opposite to the second plugging end 174 to form a second stop block 172.

A second plugging groove 147 with a length larger than the length of the second plugging end 174 is formed in the bottom shell 14, so that after the solar panel and the conducting spring 16 are mounted in the third mounting cavity 144 and the fourth mounting cavity 146, a front end of the bottom shell 14 is arranged above the second stop block 172, and the second plugging end 174 is arranged in the second plugging groove 147. The length of the second plugging groove 147 is larger than that of the second plugging end 174, so that the second plugging end 174 can be conveniently arranged in the second plugging groove 147. The head part 1 also includes a plurality of cover bodies 12 with accommodating grooves 121, the bottom shell 14 is connected with the face shell 17 to form first joint ends 13 on both sides of the head part 1, and the first joint ends 13 are arranged in the accommodating grooves 121. The connection stability of the bottom shell 14 and the face shell 17 can be improved by using the cover bodies 12.

Here, it should be noted that the maximum output power of the solar panel to convert light energy into electric energy is not greater than the maximum power of the motor 26, so that the motor 26 is prevented from being easily damaged when the solar panel is directly connected with the motor 26. Although the voltage output by the solar panel in this way is unstable, the driving of the motor 26 is not influenced. Certainly, in order to stabilize the output voltage of the solar panel, a circuit board may be configured between the solar panel and the motor 26, wherein the circuit board is arranged in the gear box 2 or the head part 1.

In other embodiments, the solar panel can be directly pasted on an upper surface of the head part 1 or embedded in the upper surface of the head part 1, and the conducting plate 41 and the conducting spring 16 can be replaced by connectors. The power supply module 11 can also be a battery, and the bottom shell 14 and the face shell 17 can be detachably connected directly through screws or buckles.

In one embodiment, two second cylinders 15 are formed at the bottom of the bottom shell 14, the two second cylinders 15 form two eyes of the head part 1, and the gear box 2 can be a robot body and is matched with the assembly component 3 to form a robot.

Figure 51:
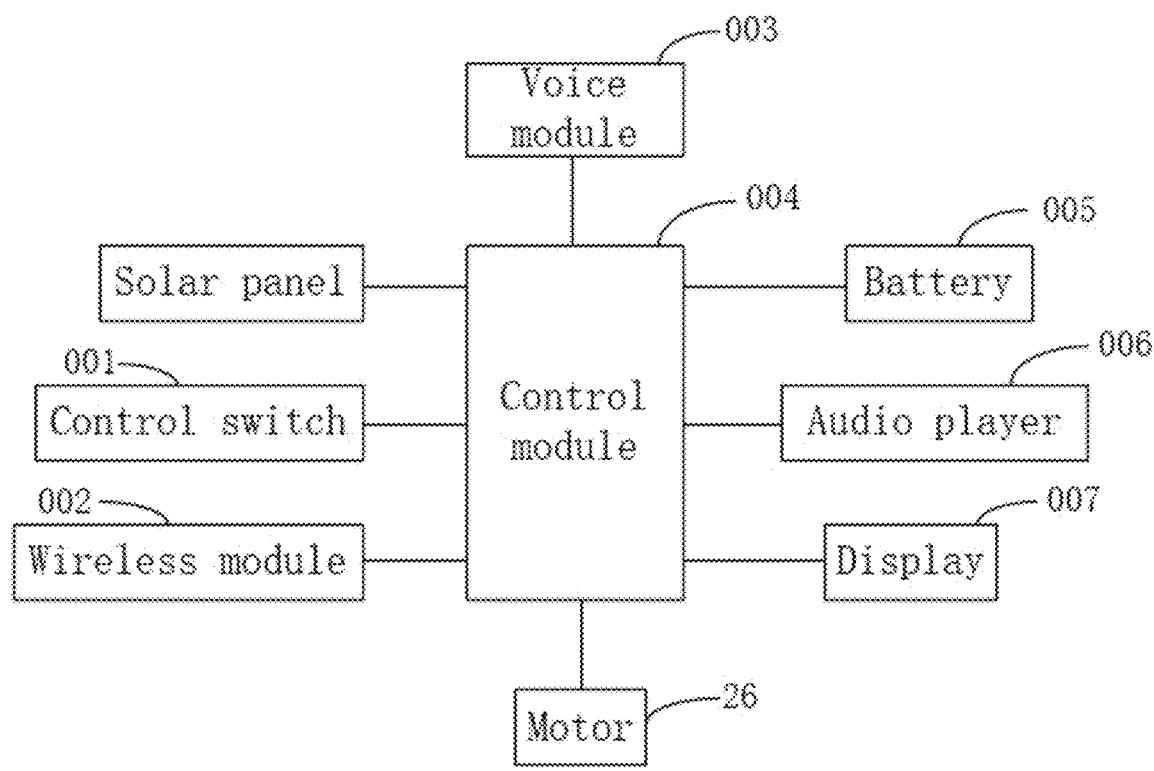
FIG. 51 is a principle block diagram of the circuit of the present disclosure.

Referring to FIG. 51, in one embodiment, the assembled robot toy further includes a control module 004 and a battery 005. The battery 005 is installed on the head part 1 or the gear box 2. The solar panel, the motor 26, and the battery 005 are all electrically connected to the control module 004. The solar panel is used for converting light energy into electrical energy and transmitting the electrical energy to the control module 004. The control module 04 is used for receiving the electrical energy, and directly driving the motor 26 and/or storing the electrical energy on the battery 005 after processing the electrical energy.

By using the battery 005 to store electrical energy, when the toy in this embodiment is not placed under sunlight, the motor 26 can also be driven to work, so as to drive the gear box 2 and the assembly component 3 to move. After the control module 004 is utilized to filter and stabilize the voltage transmitted by the solar panel, the voltage is transmitted to the motor 26 and/or the battery 005, so as to ensure stable charging of the battery 005 and prevent voltage instability from damaging the battery 005, or output stable voltage to the motor 26 to ensure stable operation of the motor 26 and prevent the motor 26 from being damaged by too high voltage.

In this embodiment, the assembled robot toy further includes a control switch 001 electrically connected to the control module 004. The control module 004 is further used for driving the motor 26 when the control switch 001 is operated. When the user needs to move the toy, the control switch 001 can be operated. As a result, the control module 004 detects an electrical signal of the control switch 001 to drive the motor 26 to work. During this process, if the toy is in the sun, the control module 004 can directly process the electrical energy transmitted by the solar panel and then drive the motor 26 to work. When the toy is not in the sun or there is insufficient sunlight, the battery 005 provides electrical energy to the control module, and control module 004 uses this electrical energy to drive the motor 26 to work.

Specifically, the control switch 001 can be one of a dual in-line package (DIP) switch, button, or touch switch. The control switch 001 can be arranged on the gear box 2 or the head part 1. In an optimal embodiment, both the control switch 001 and the control module 004 are arranged on an identical component.

In one embodiment, the assembled robot toy can also include a wireless module 002 electrically connected to the control module 004. The wireless module 002 is configured for receiving a wireless signal from an external device and transmitting the wireless signal to the control module 004. The control module 004 is configured for receiving the wireless signal and driving the motor 26 to work, so as to wirelessly drive the toy to move and facilitate the user to play. Specifically, the wireless module 002 can be installed on the gear box 2 or the head part 1. The wireless module 002 can be an infrared module, Bluetooth module, 2.4 G module, 2 G module, 3 G module, 4 G module, etc. Optimally, the control switch 001, the wireless module 002, and the control module 004 are all arranged on an identical component.

In one embodiment, the assembled robot toy further includes an audio player 006 electrically connected to the control module 004. The control module 004 drives the audio player 006 to play audio when the control switch 001 is operated or the wireless signal is received. It should be understood that the wireless module 002 can also be used for receiving audio data transmitted by the external device and play it through the audio player 006, so that the toy in this embodiment can play audio, thereby improving the practicality and playability of the toy. Specifically, the audio player 006 is a speaker, and the speaker is disposed on the head part 1 or the gear box 2.

In one embodiment, the assembled robot toy further includes a voice module 003 electrically connected to the control module 004, and the voice module 003 can be used for storing audio data. The control module 004 drives the audio player 006 to play the corresponding audio in the audio data when the control switch 001 is operated or the wireless signal is received, so as to make the toy emit sound in this embodiment and improve the entertainment of the toy. Specifically, the voice module 003 and the control module 004 are disposed on an identical component.

In one embodiment, the assembled robot toy further includes a display 007 electrically connected to the control module 004, and the display 007 is used for displaying display data transmitted by the control module 004. The display data at least includes an electrical quantity of the battery 005, so that the user can understand the electrical quantity of the battery 005. Specifically, the display 007 can be a display screen or a digital display.

In the embodiments equipped with the conducting plate 41 and the conducting spring 16, the assembled robot toy further includes a circuit board 008. The control module 004, the wireless module 002, and the voice module 003 are all integrated on the circuit board 008. The circuit board 008, the audio player 006, the battery 005, the display 007, and the control switch 001 are all arranged on the head part 1, so that the wireless module 002, the voice module 003, the battery 005, the audio player 006, the display 007, and the control switch 001 are electrically connected to the control module 004. The conducting spring can be soldered onto the circuit board 008, or the conducting plate 41 can be electrically connected to the circuit board 008 through wires, so that when the conducting plate 41 is inserted onto the conducting spring 16, the motor 26 is electrically connected to the control module 004 on the circuit board 008. Moreover, it is convenient to insert the conducting plate 41 onto the conducting spring 16, and using the conducting plate 41 and the conducting spring 16 can facilitate the assembly by the user and the electrical connection between the solar panel and the motor 26.

In the above embodiment, referring to FIG. 14 to FIG. 36, the assembly component 3 includes a plurality of bolts, fixed plates 312, connecting plates 313, third rotating rods 302, fixed rods 303, first cams 306, second cams 304, fluctuating gears 315, accessory spur gears 311, straight-line connecting rods 322, force arm connecting rods 301, arc-shaped connecting rods 316, T-shaped connecting rods 307, symmetrical semicircular pieces 308, U-shaped pieces 309 and wheels 314.

Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the bolt and the fixed rod 303. The accessory spur gear 311 can be used for being meshed with the transmission gear set 200. The accessory spur gear 311, the second cam 304, the fluctuating gear 315 and the wheel 314 can further detachably sleeve the third rotating rod 302 or the fixed rod 303, and the second cam 304 is detachably inserted on the transmission rod 21. Thus, the user can assemble the assembly component 3 on the gear box 2 according to thoughts in a self-defined manner so as to realize the assembly of the robot.

Specifically, the bolt includes a rotating pin and a fixed pin. One end of the rotating pin, both ends of the fixed pin and both ends of the fixed rod 303 are all polygonal cylinders 330, one end of the rotating pin is a first cylinder 3191, and the first cylinder 3191 protrudes outward at one end away from the polygonal cylinder 330 to form a third clamping block 3192.

A plurality of first assembly holes 310 which can be matched with the polygonal cylinder 330 and the first cylinder 3191 are formed in the side wall of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314. Any two of the gear box 2, the fixed plate 312, the connecting plate 313, the straight-line connecting rod 322, the arc-shaped connecting rod 316, the T-shaped connecting rod 307, the U-shaped piece 309, the force arm connecting rod 301, the symmetrical semicircular piece 308, the first cam 306, the second cam 304 and the wheel 314 are both detachably connected through one of the rotating pin, the bolt and the fixed rod 303. A second assembly hole 320 for plugging the fixed rod 303 and the third rotating rod 302 is formed in the middle of the accessory spur gear 311, the second cam 304 and the fluctuating gear 315, so that the accessory spur gear 311, the second cam 304 and the fluctuating gear 315 can sleeve the fixed rod 303 and the third rotating rod 302. Besides the first assembly hole 310, a third assembly hole 340 is formed in the middle of the first cam 306, and is used for being matched and connected with both ends of the third rotating rod 302.

The first assembly hole 310 and the third assembly hole 340 are both circular holes. The diameter of the third assembly hole 340 is slightly smaller than the diameter of the first assembly hole 310. The second assembly hole 320 is a polygonal hole. The longest width of the polygonal cylinder 330 is matched with the diameter of the first assembly hole 310. The diameter of the first cylinder 3191 is slightly smaller than that of the first assembly hole 310. The width of the third clamping block 3192 is slightly larger than that of the first assembly hole 310. In this way, the polygonal cylinders 330 on the bolt and the rotating pin pass through the first assembly holes 310 of two parts, so that the two parts can be fixed and difficult to rotate. The first cylinder 3191 on the rotating pin passes through the first assembly holes 310 in two parts, so that the two parts rotate mutually. Moreover, the first cylinder 3191 passes through the first assembly hole 310 of one part, and the part can rotate along the first cylinder 3191.

The diameters of both ends of the third rotating rod 302 are smaller than the diameter of the first assembly hole 310 and are matched with the size of the third assembly hole 340. The assembly component 3 also includes a switch part 305. A third assembly hole 340 for plugging and connecting both ends of the third rotating rod 302 is formed in one end of the switch part 305. One end of the switch part 305 is also a polygonal cylinder 330 which is matched with the size of the first assembly hole 310, so that the third rotating rod 302 can rotate after passing through the first assembly hole 310, and then the switch part 305 is used for connecting the wheel 314, the second cam 304 and other parts.

A first sliding hole 3071 and a second sliding hole 3072 perpendicular to the first sliding hole 3071 are formed in the T-shaped connecting rod 307, and the widths of the first sliding hole 3071 and the second sliding hole 3072 are the same as the diameter of the first assembly hole 310. The first cylinder 3191 of the rotating pin is clamped and limited with the second sliding hole 3072 and the first sliding hole 3071 through the third clamping block 3192 after passing through the second sliding hole 3072 and the first sliding hole 3071, so that the first cylinder 3191 of the rotating pin can move back and forth along the length directions of the second sliding hole 3072 and the first sliding hole 3071.

The fluctuating gear 315 is provided with a plurality of arc-shaped teeth 3151 arranged around the fluctuating gear 315. The fluctuating gear 315 can be used for decoration or two adjacent arc-shaped teeth 3151 can accommodate one end of the straight-line connecting rod 322. The symmetrical semicircular piece 308 is formed by connecting two semicircular plates 3081 in central symmetry. A side wall of the second cam 304 is surrounded by first gear teeth 3041. An inner side of the arc-shaped connecting rod 316 is provided with second gear teeth 3161 meshed with the second cam 304, so that the assembly is convenient for the user.

In one embodiment, at least one plane is formed on an outer side wall of the third rotating rod 302. The shape of the second assembly hole 320 is consistent with the outer side wall of the third rotating rod 302, so that when the accessory spur gear 311 and the second cam 304 sleeve the third rotating rod 302, the third rotating rod 302 rotates to drive the accessory spur gear 311 and the second cam 304 to move and rotate, or when the accessory spur gear 311 and the second cam 304 rotate, the third rotating rod 302 is driven to rotate.

Specifically, a cross section of the outer side wall of the third rotating rod 302 is a hexagon, a pentagon, an octagon and the like. A cross section of an outer side wall of the fixed rod 303 is circular. The diameter of the fixed rod 303 is equal to the distance between two opposite sides of the hexagon, so that when the accessory spur gear 311 and the second cam 304 sleeve the fixed rod 303, the fixed rod 303 does not hinder the rotation of the accessory spur gear 311 and the second cam 304, and the assembly is convenient for the user.

In one embodiment, a plurality of annular clamping grooves 3021 are formed in the outer side walls of the fixed rod 303 and the third rotating rod 302 at equal intervals. The assembly component 3 also includes a plurality of fixed sleeves 321 sleeving the fixed rod 303 or the third rotating rod 302. At least one U-shaped opening 3211 is formed in a side wall of the fixed sleeve 321. One end of an inner side wall of the fixed sleeve 321 protrudes inward to form a second clamping block 3212 matched with the annular clamping groove 3021. And then, in order to fix the position of the accessory spur gear 311 and the second cam 304 on the fixed rod 303 or the third rotating rod 302, fixed sleeves 321 can respectively sleeve the third rotating rods 302 on both sides of the third gear and the second cam 304, and the second clamping block 3212 is clamped with the annular clamping groove 3021 to fix the fixed sleeve 321 on the third rotating rod 302 so as to limit the accessory spur gear 311 and the second cam 304 on the fixed rod 303 or the third rotating rod 302.

Figure 37:
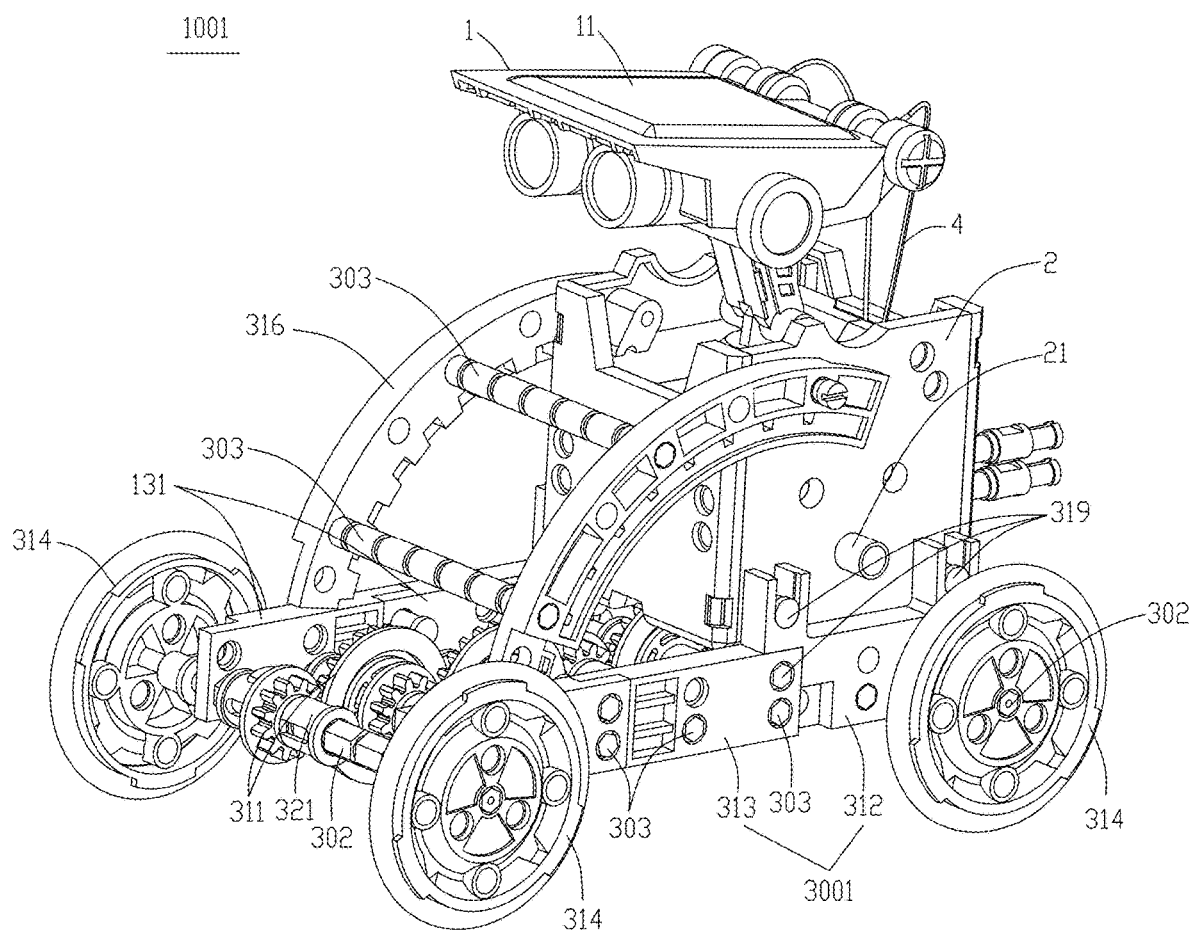
FIG. 37 is a schematic diagram of the form of a baby carriage robot in the present disclosure.
Figure 38:
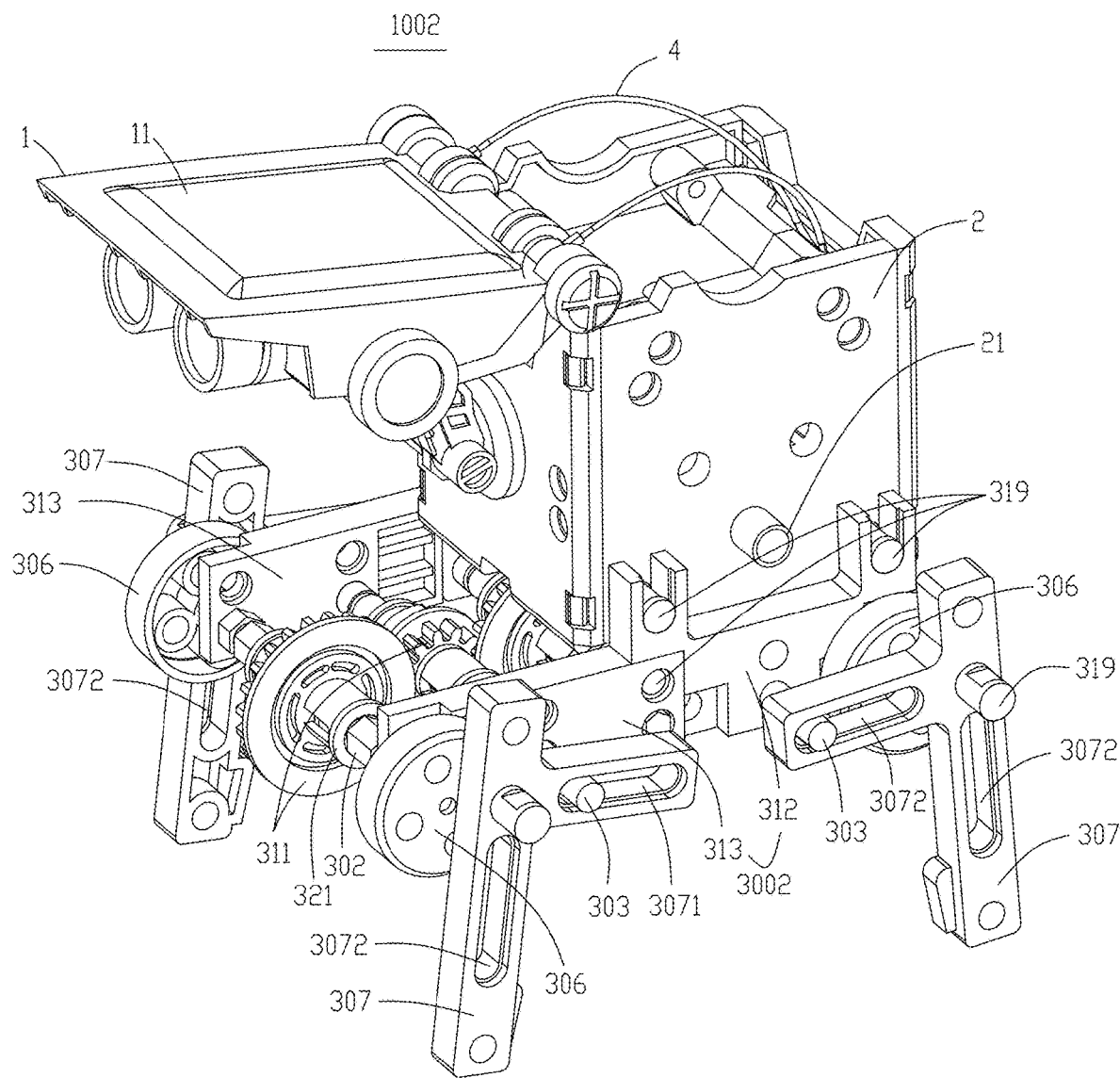
FIG. 38 is a schematic diagram of the form of a quadruped robot in the present disclosure.
Figure 39:
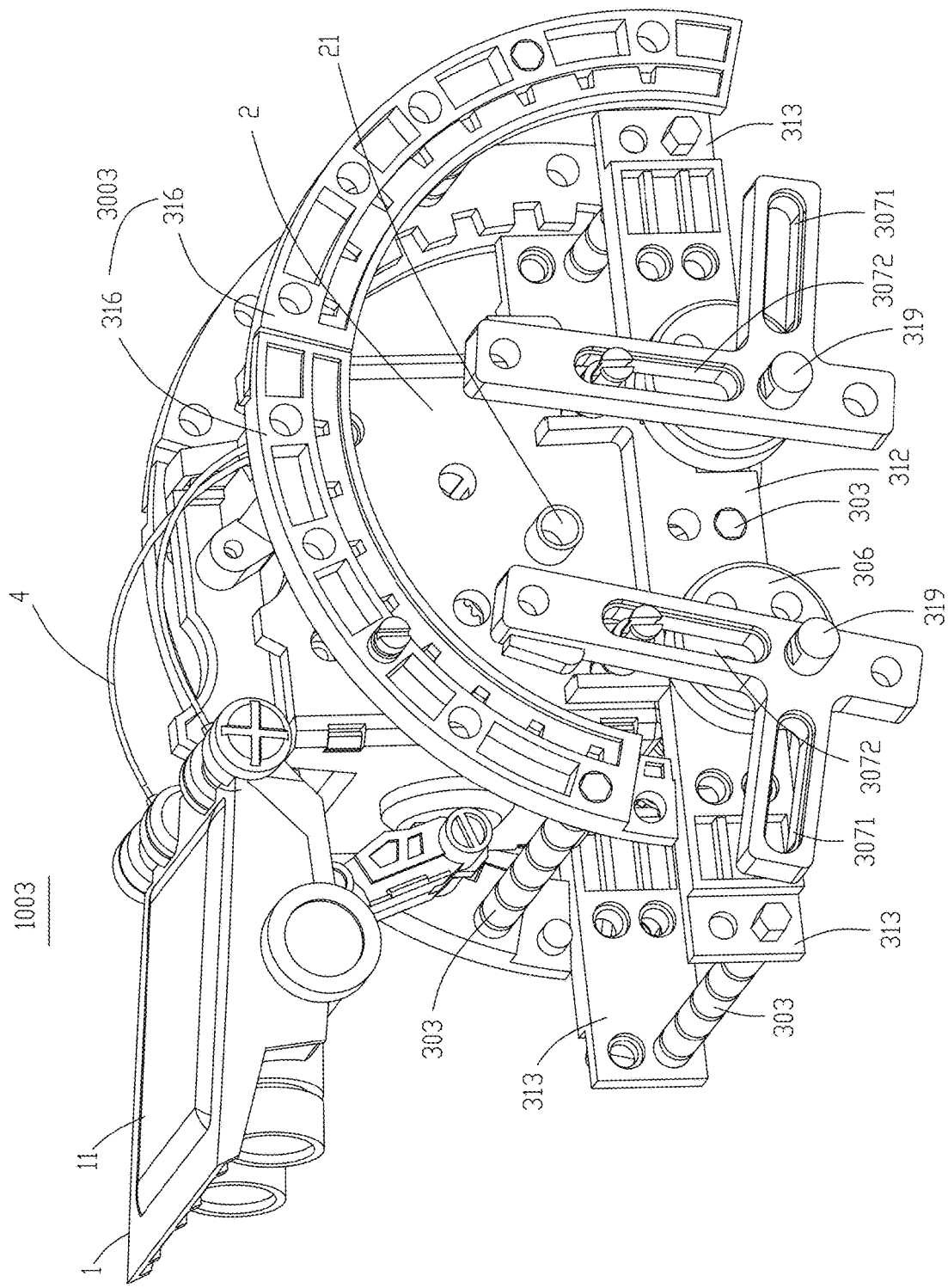
FIG. 39 is a schematic diagram of the form of a turtle robot in the present disclosure.
Figure 40:
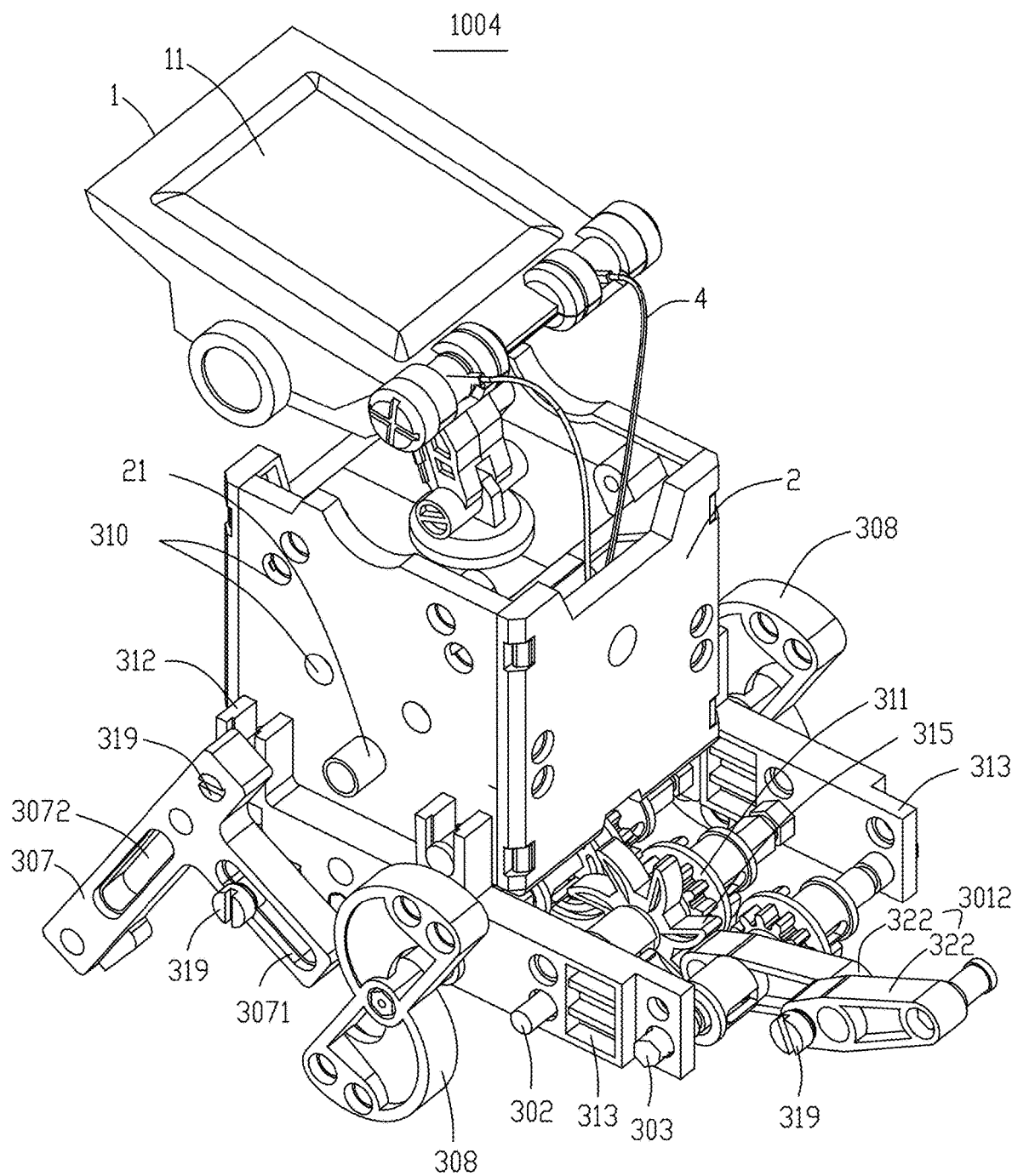
FIG. 40 is a schematic diagram of the form of a puppy robot in the present disclosure.
Figure 41:
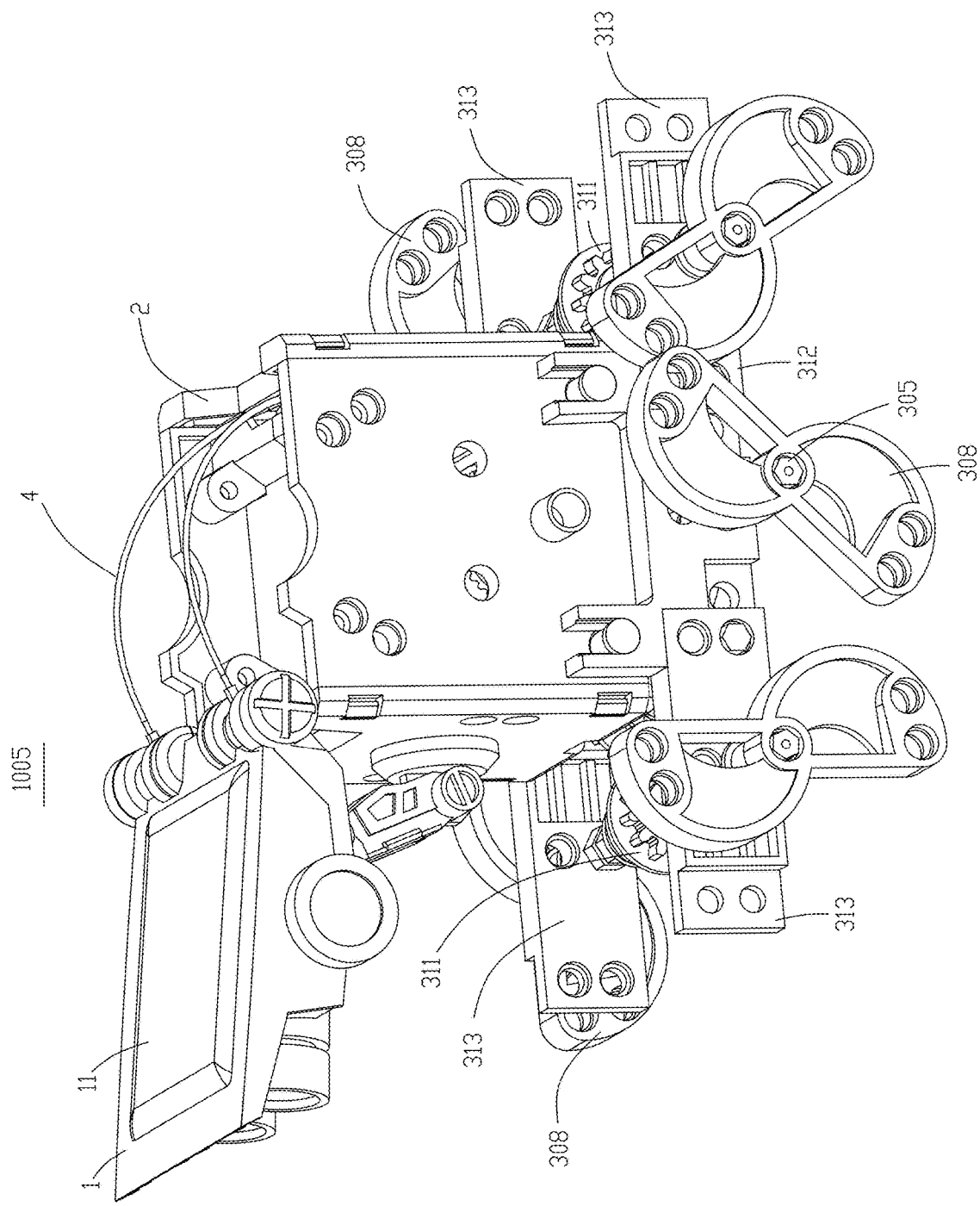
FIG. 41 is a schematic diagram of the form of a beetle robot in the present disclosure.
Figure 42:
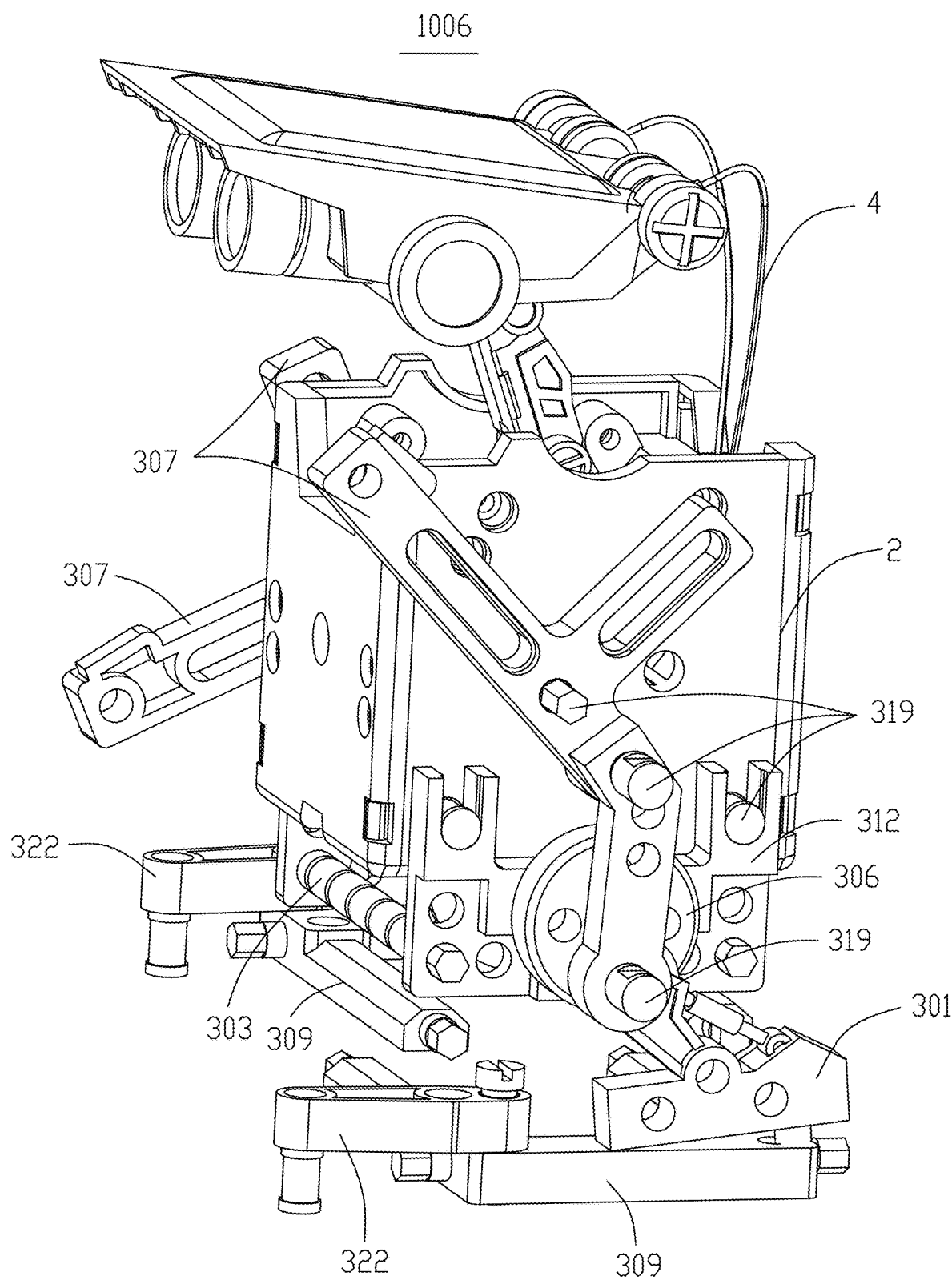
FIG. 42 is a schematic diagram of the form of a Walker robot in the present disclosure.
Figure 43:
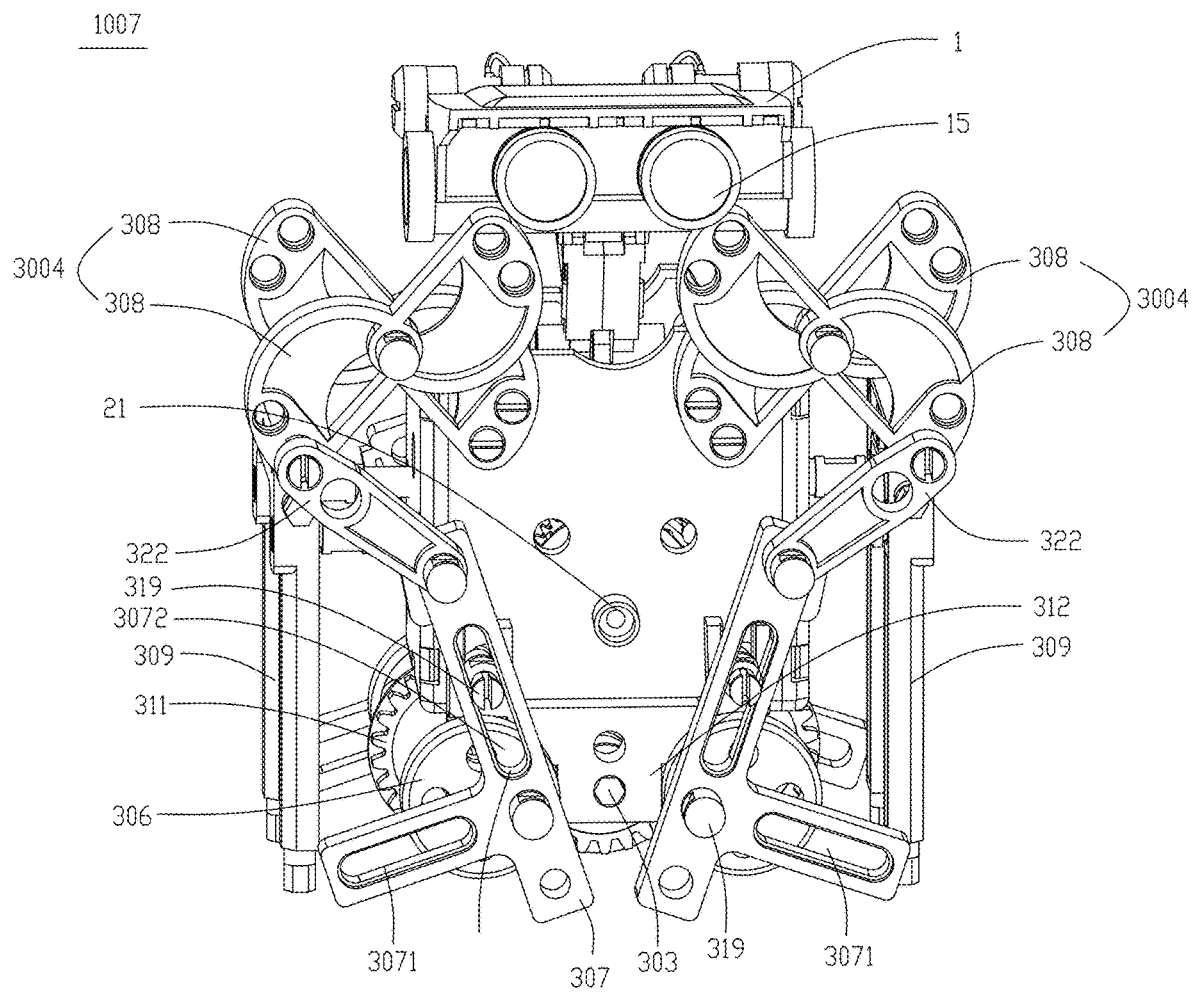
FIG. 43 is a schematic diagram of the form of a crab robot in the present disclosure.
Figure 44:
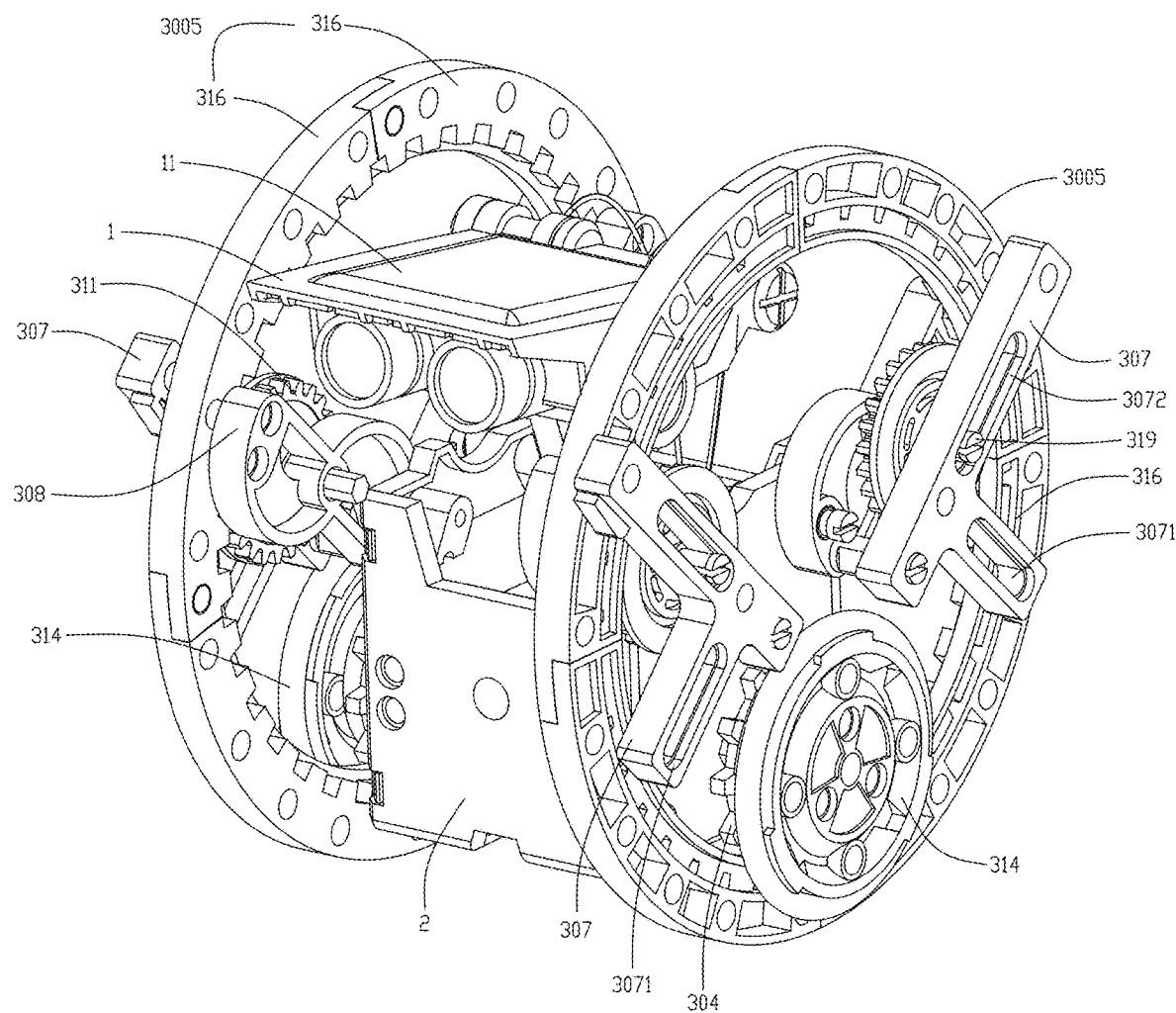
FIG. 44 is a schematic diagram of the form of a pudgy robot in the present disclosure.
Figure 45:
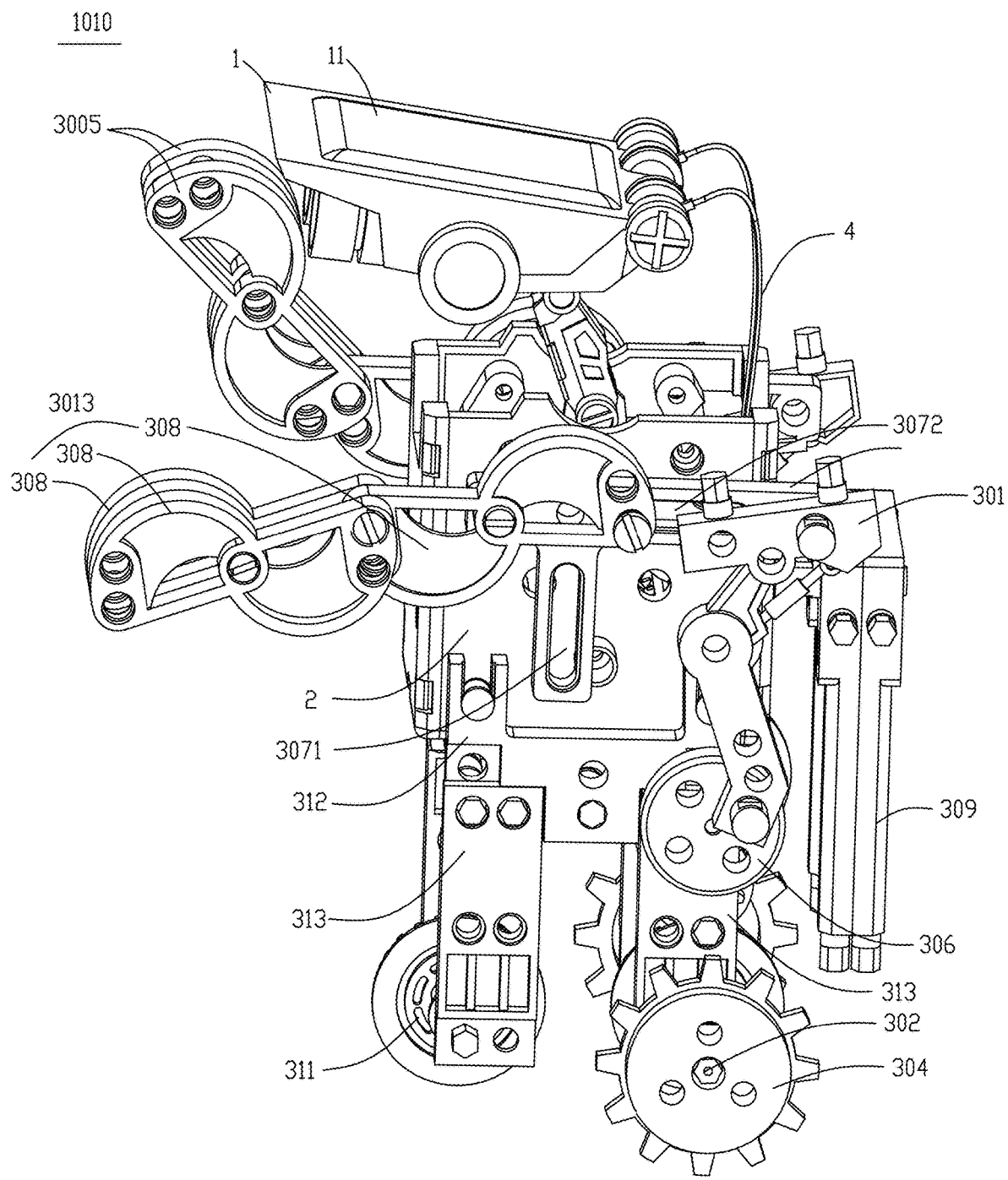
FIG. 45 is a schematic diagram of the form of a zombie robot in the present disclosure.

In the above embodiment, the numbers of the gear box 2 and the head part 1 may be plural. In cooperation with the assembly component 3, the shape of the assembled robot toy may be assembled into a baby carriage robot 1001 (as shown in FIG. 37), a quadruped robot 1002 (as shown in FIG. 38), a turtle robot 1003 (as shown in FIG. 39), a puppy robot 1004 (as shown in FIG. 40), a beetle robot 1005 (as shown in FIG. 41), a Walker robot 1006 (as shown in FIG. 42), a crab robot 1007 (as shown in FIG. 43), a pudgy robot 1008 (as shown in FIG. 44), a crawling robot 1009 (as shown in FIG. 46), and a zombie robot 1010 (as shown in FIG. 45) and the like.

Specifically, when the assembled robot toy is assembled into the crawling robot 1009, parts needed for the crawling robot 1009 and the positional relationship of the parts are as follows.

Figure 46:
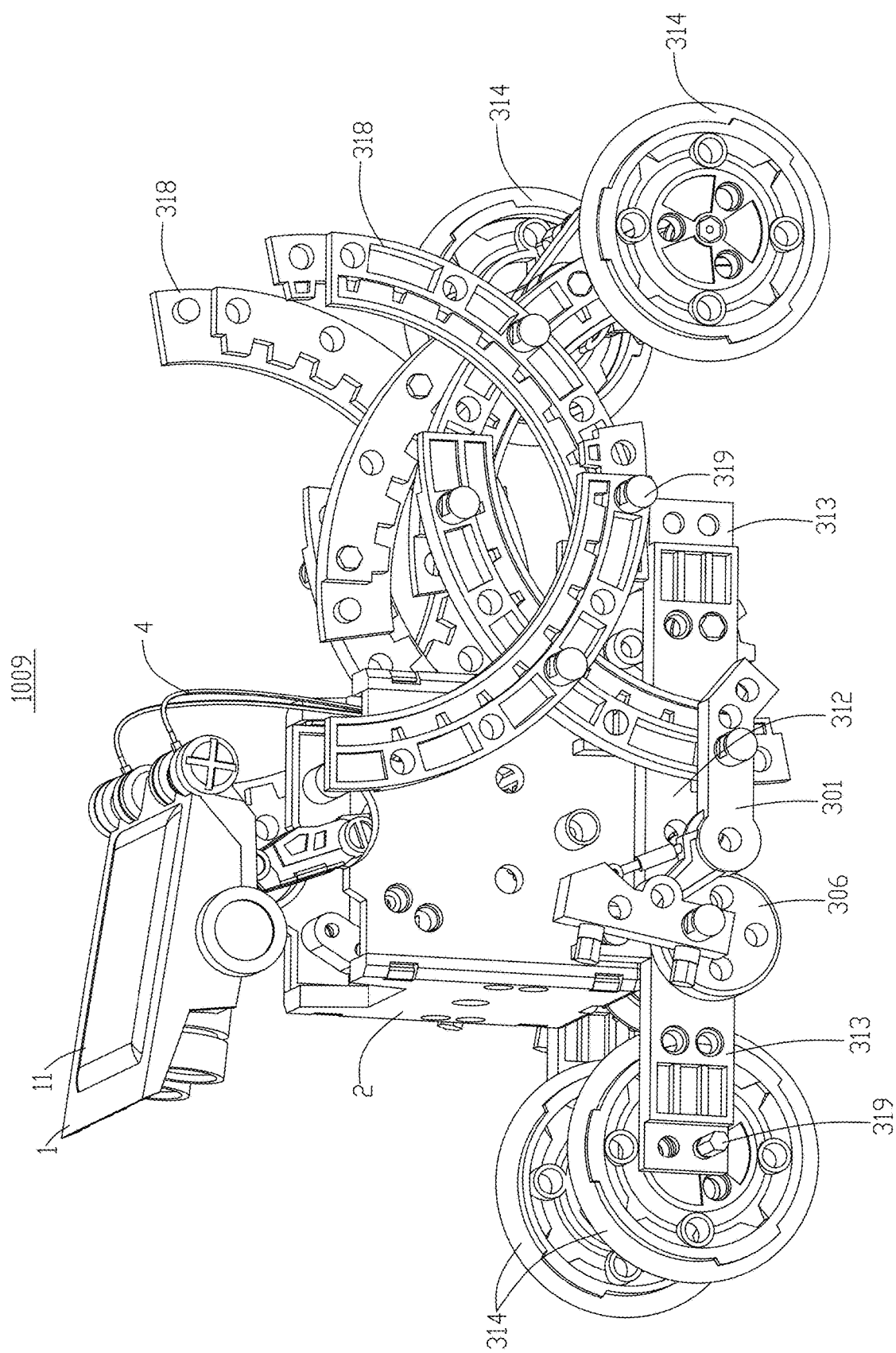
FIG. 46 is a schematic diagram of the form of a crawling robot in the present disclosure.
Figure 47:
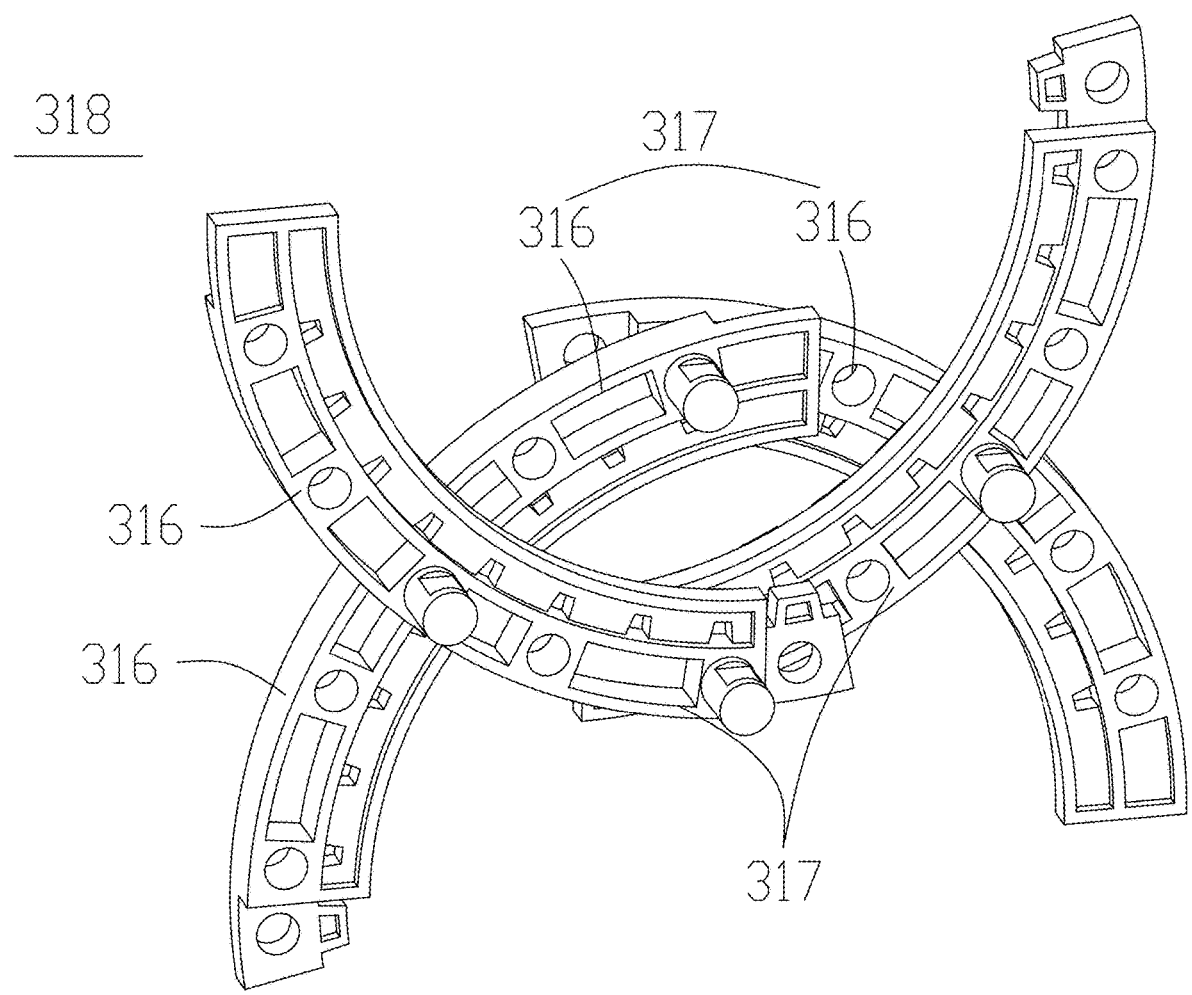
FIG. 47 is a schematic diagram of the form of a crawling component in the present disclosure.

Referring to FIG. 46 and FIG. 47, the numbers of the gear boxes 2 and the head parts 1 are one, and the head part 1 is arranged on the top of the gear box 2. The number of the fixed plates 312 is two, and the two fixed plates 312 are respectively detachably arranged on the left and right sides of the gear box 2 through bolts. The number of the connecting rods is four, and the four connecting rods are respectively arranged at the front and rear ends of the two fixed plates 312. The fixed plate 312 and the connecting plate 313 are connected through bolts. The numbers of the first cams 306, the force arm connecting rods 301 and the third rotating rods 302 are two. The number of the fixed rods 303 is at least two. The number of the wheels 314 is four. The number of the arc-shaped connecting rods 316 is eight. Both ends of one third rotating rod 302 are connected with a central position of the first cam 306 after respectively passing through the front ends of two opposite fixed plates 312. Both ends of one fixed rod 303 are respectively connected with the rear ends of the two opposite fixed plates 312. One end of each of every two arc-shaped connecting rods 316 is connected through rotating pins to form a similarly semicircular connecting rod 317. Three-quarters and one-quarter positions of every two similarly semicircular connecting rods 317 are connected through rotating pins to form a crawling component 318. The opening directions of the two similarly semicircular connecting rods 317 in the crawling component 318 are opposite. Both ends of each force arm connecting rod 301 are respectively connected with a non-central position of the first cam 306 and one end of the crawling component 318 through bolts. Both ends of one third rotating rod 302 are connected with the wheels 314 after respectively passing through the other end of the crawling component 318. The two wheels 314 are respectively connected with the front ends of two opposite connecting plates 313 at the front end of the fixed plate 312 through bolts. The number of the accessory spur gears 311 is at least two. One accessory spur gear 311 sleeves the third rotating rod 302 with the first cam 306, and the other accessory spur gear 311 sleeves the fixed rod 303 adjacent to one accessory spur gear 311 and is respectively meshed with the transmission gear set 200 and the accessory spur gear 311 which is positioned on the fixed rod 303.

Therefore, when the transmission gear set 200 rotates to drive the accessory spur gear 311 to rotate, the third rotating rod 302 can rotate and drive the first cam 306 to rotate, so that the similarly semicircular connecting rod 317 is pulled to move forward by the force arm connecting rod 301. During the movement, each similarly semicircular connecting rod 317 can be contracted to arch, and be pulled to expand, thus realizing walking state of a caterpillar. At least such one or more accessory spur gears 311 form a bottom movement assembly (see FIG. 46 as an example), and at least the first cams 306 and the wheels 314 form side movement assemblies (see FIG. 47 as an example).

Figure 48:
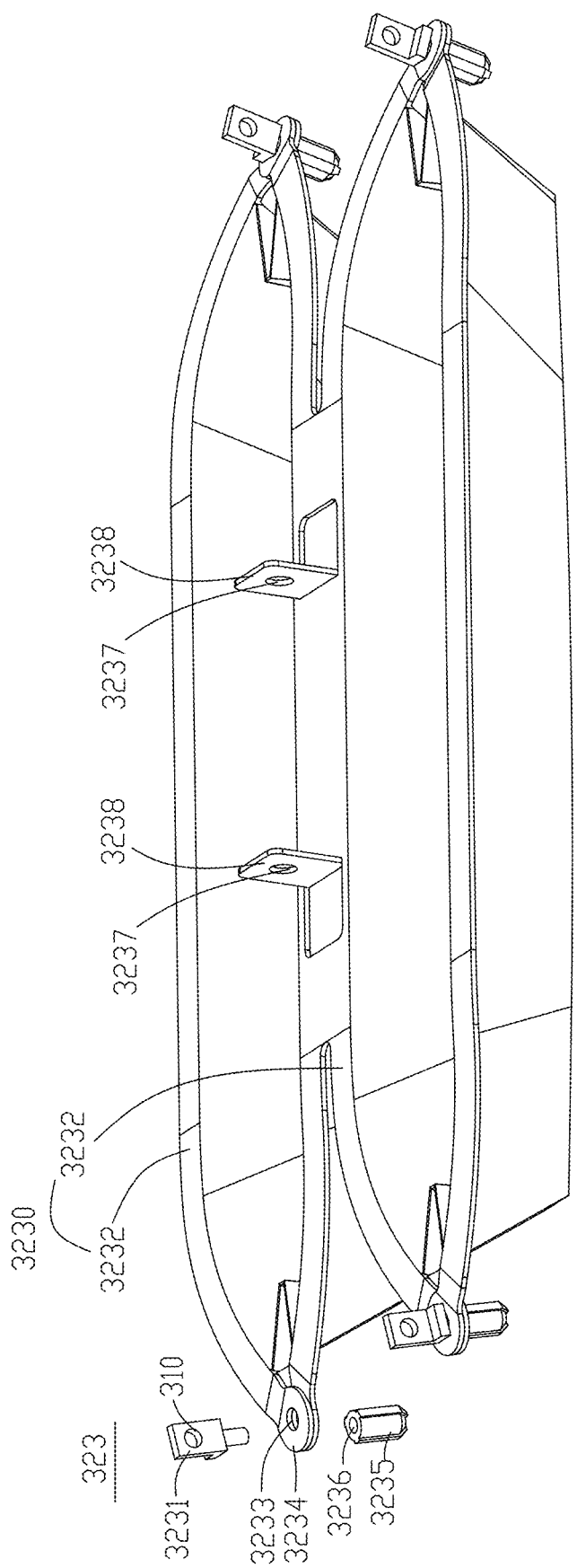
FIG. 48 is a schematic diagram of a hull in the present disclosure.

In one embodiment, referring to FIG. 48, the assembly component 3 also includes a hull 323. Two first lugs 3238 arranged at intervals are formed on the hull 323. A fourth assembly hole 3237 is formed in the first lug 3238. The number of the fixed plates 312 is two, and the two fixed plates 312 are respectively fixed on the front and rear side walls of the gear box 2. The first lug 3238 is connected to the fixed plate 312 after passing through the fourth assembly hole 3237 through a bolt. Specifically, the first lug 3238 can be fixed with the gear box 2 through the bolt. Therefore, the assembly of the hull 323 and the gear box 2 is realized.

In the above embodiment, the hull 323 includes a foldable plastic sheet 3230, a first plug connector 3231 and a cap body 3235 with a third plugging groove 3236, and the first lug 3238 is foldably connected to the hull 323. The plastic sheet 3230 includes two connected first sheets 3232, and the first lug 3238 is positioned at the position where the two first sheets 3232 are connected. Both ends of the first sheet 3232 are provided with two second lugs 3234 at intervals. A fifth assembly hole 3233 is formed in the second lug 3234. The first plug connector 3231 is arranged in the third plugging groove 3236 after passing through the fifth assembly holes 3233 in the two lugs at one end of the first sheet 3232. Thus, the sheet-like plastic sheet 3230 can be folded to form a catamaran hull 323 so as to effectively reduce the overall volume of the assembled robot toy in the embodiment and facilitate transportation. Certainly, in other embodiments, the hull 323 may also be a complete body without being folded.

Figure 49:
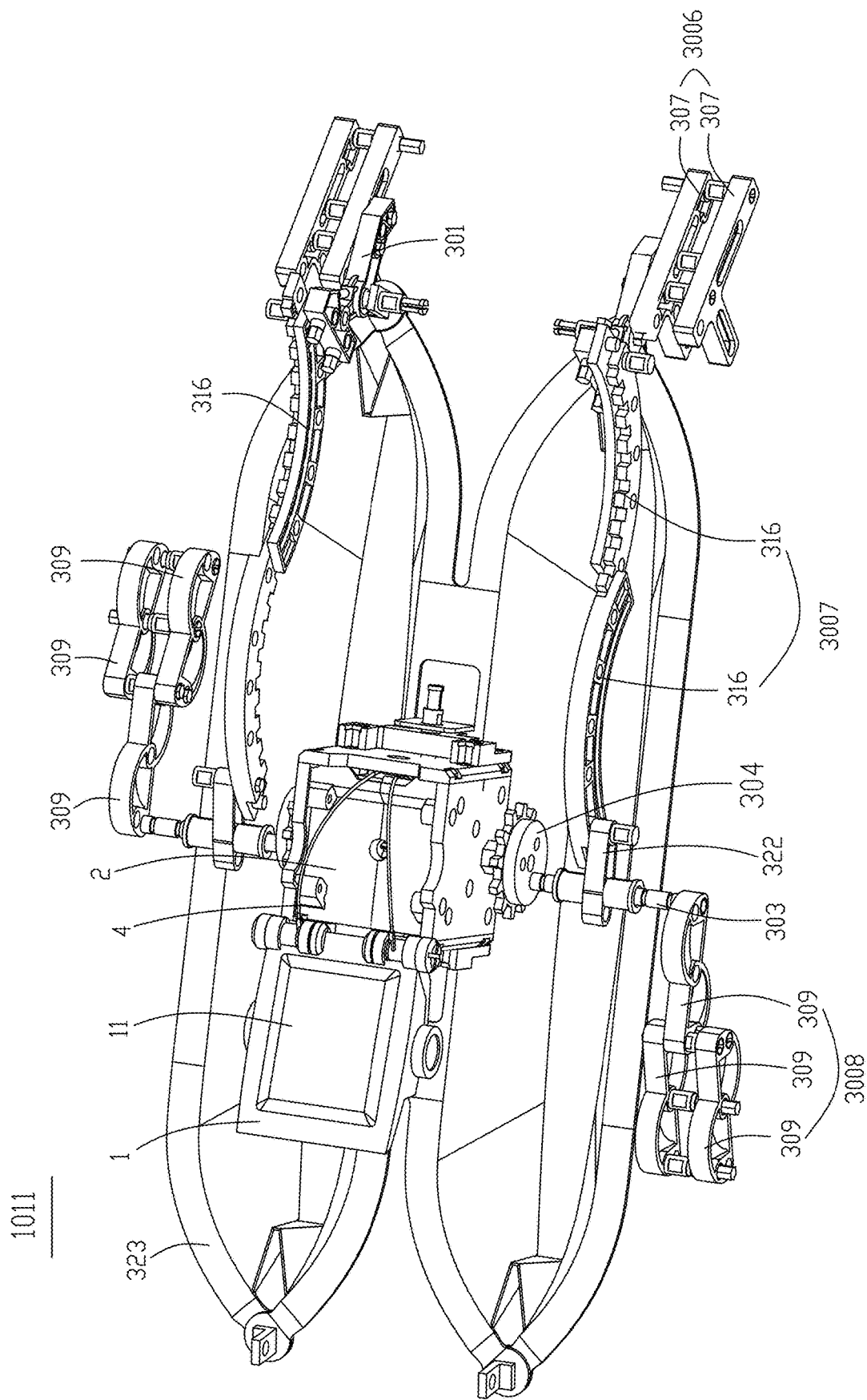
FIG. 49 is schematic diagram of the form of a surfing robot in the present disclosure.
Figure 50:
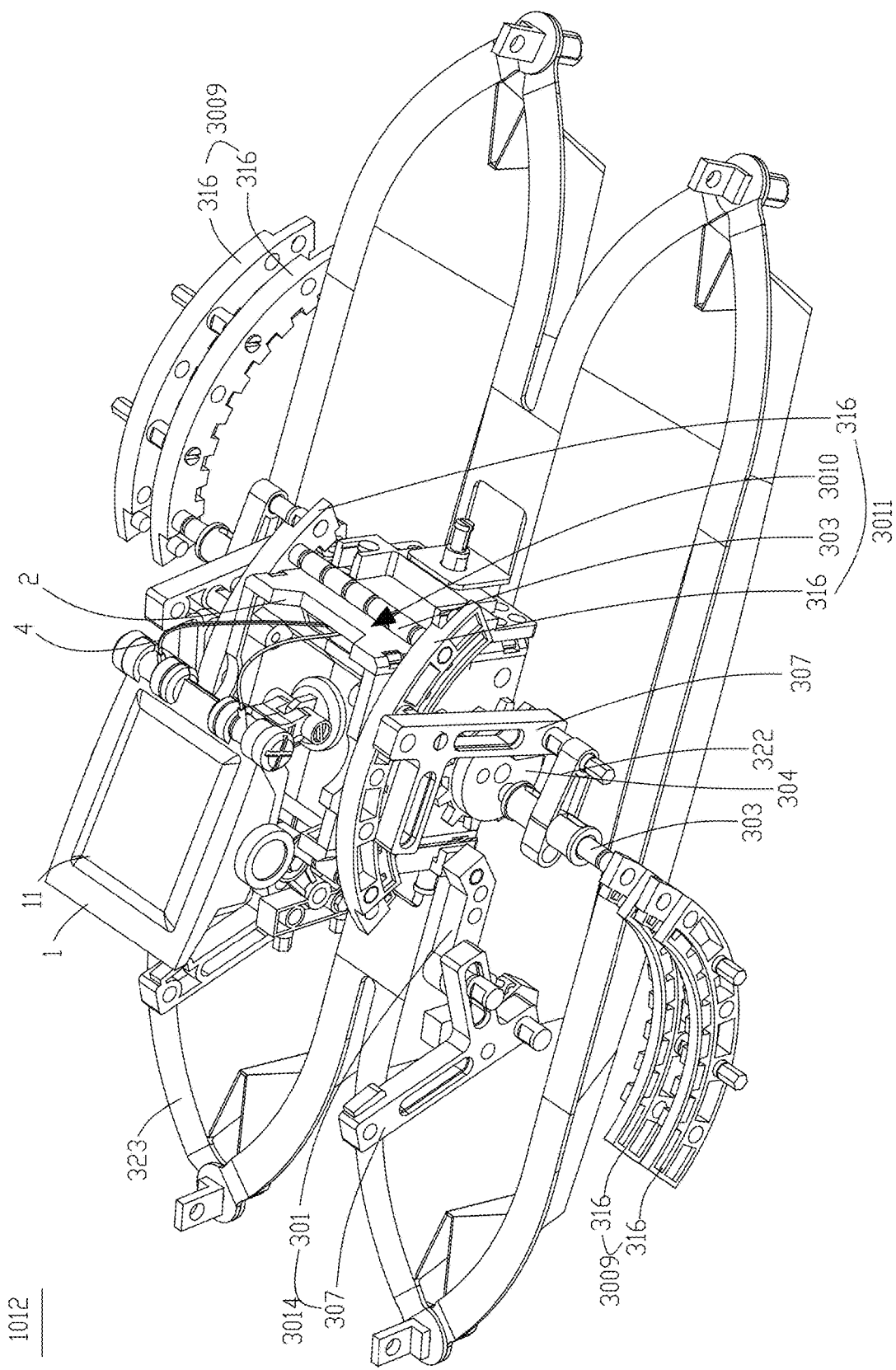
FIG. 50 is a schematic diagram of the form of a bowing robot in the present disclosure.

In one embodiment, in conjunction with parts such as the hull, the assembled robot toy can also be the surfing robot 1011 (as shown in FIG. 49), the rowing robot 1012 (as shown in FIG. 50), etc.

In the above embodiment, limit discs 231 are arranged on one side, away from the seventh gear 233, of the eighth gear 232 and on the side of the accessory spur gear 311, so that the accessory spur gear 311 can be meshed with the eighth gear 232 stably.

The above description only describes embodiments of the present disclosure, and is not intended to limit the present disclosure; various modifications and changes can be made to the present disclosure. Any modifications, equivalent substitutions, and improvements made within the spirit and scope of the present disclosure are intended to be included within the scope of the present disclosure.

What is claimed is:

1. An assembled robot toy, comprising a power supply module, a gear box, a rod component, a head part and an assembly component, wherein the head part and the assembly component are detachably arranged on the gear box;
   wherein the gear box comprises a motor, a first gear, and a transmission gear set; the first gear is arranged on a rotating shaft of the motor, the transmission gear set comprises a second gear that meshes with the first gear, a total number of teeth of the first gear is less than a total number of teeth of the second gear, the rod component is connected to the second gear, and the assembly component is connected to the transmission gear set and/or the rod component;
   wherein the rod component is configured for rotating through the transmission of the first gear and the transmission gear set when the motor is driven, and at least one part of the assembly component is configured for moving and driving the gear box and the head part to move when the transmission gear set and/or the rod component rotate;
   wherein the power supply module comprises a solar panel for converting light energy into electrical energy, and the solar panel is electrically connected to the motor, wherein the head part is rotatably connected with the gear box, and the head part comprises a bottom shell, and a face shell detachably connected with the bottom shell, the solar panel is arranged between the bottom shell and the face shell, and a display port is formed in the face shell at the position corresponding to the solar panel.

2. The assembled robot toy according to claim 1, wherein the solar panel is used for converting light energy into electrical energy and transmitting the electrical energy to the motor, and the motor is configured for receiving the electrical energy transmitted by the solar panel and being driven.

3. The assembled robot toy according to claim 1, further comprising a control module and a battery, wherein the battery is installed on the head part or the gear box; the solar panel, the motor, and the battery are all electrically connected to the control module; the solar panel is used for converting light energy into electrical energy and transmitting the electrical energy to the control module; the control module is used for receiving the electrical energy, and directly driving the motor and/or storing the electrical energy on the battery after processing the electrical energy.

4. The assembled robot toy according to claim 3, wherein the assembled robot toy further comprises a control switch electrically connected to the control module, and the control module is further used for driving the motor when the control switch is operated.

5. The assembled robot toy according to claim 4, further comprising a wireless module electrically connected to the control module, wherein the wireless module is configured for receiving a wireless signal from an external device and transmitting the wireless signal to the control module, and the control module is configured for receiving the wireless signal and driving the motor to work.

6. The assembled robot toy according to claim 5, further comprising an audio player and a voice module electrically connected to the control module, wherein the control module drives the audio player to play audio when the control switch is operated or the wireless signal is received, and the voice module is used for storing audio data, and the control module drives the audio player to play the audio in the audio data when the control switch is operated or the wireless signal is received.

7. The assembled robot toy according to claim 3, further comprising a display electrically connected to the control module, wherein the display is used for displaying display data transmitted by the control module, and the display data at least comprises an electrical quantity of the battery.

8. The assembled robot toy according to claim 7, wherein the rod component comprises a first rotating rod and a second rotating rod, and the second gear is arranged on the first rotating rod;
the transmission gear set comprises: a third gear arranged on the first rotating rod, a fourth gear and a fifth gear both arranged on the second rotating rod, and a sixth gear engaged with the fifth gear; the sixth gear is arranged on the first rotating rod, the fifth gear is connected to the fourth gear, the third gear is engaged with the fourth gear, and the fifth gear is engaged with the sixth gear; a total number of teeth of the third gear is less than a total number of teeth of the fourth gear, a total number of teeth of the fifth gear is less than a total number of teeth of the sixth gear, and the first rotating rod is connected to the assembly component;
the first rotating rod rotates through the transmission of the first gear and the second gear when the motor is driven, the third gear is driven to rotate when the first rotating rod rotates, the fourth gear is driven to rotate when the third gear rotates, the fifth gear is driven to rotate when the fourth gear rotates, the sixth gear is driven to rotate when the fifth gear rotates, the second rotating rod is driven to rotate when the fifth gear rotates, and the assembly component is configured for moving when the first rotating rod or the sixth gear rotates.

9. The assembled robot toy according to claim 8, wherein the transmission gear set further comprises a seventh gear and an eighth gear, the seventh gear and the eighth gear are arranged on the first rotating rod, the seventh gear is a spur gear, the eighth gear is a spur gear, the gear box is provided with a first avoidance hole at the position corresponding to the seventh gear and the eighth gear, the seventh gear and the eighth gear are both driven to rotate when the first rotating rod rotates, a diameter of the seventh gear is smaller than a diameter of the eighth gear, and the assembly component is connected to one or more of the first rotating rod, the seventh gear, and the eighth gear;
the rod component further comprises a plurality of transmission rods connected to the assembly component, at least two transmission rods are disposed at both ends of the first rotating rod, the transmission rod connected to the first rotating rod is at least partially extended into the gear box, and the gear box is provided with a second avoidance hole at the position corresponding to the transmission rod.

10. The assembled robot toy according to claim 9, wherein the gear box comprises a first shell and a second shell, and the second shell is detachably connected with the first shell to form a first mounting cavity, a second mounting cavity and the second avoidance hole;
the motor is mounted in the first mounting cavity, the transmission gear set is mounted in the second mounting cavity, and a wiring hole communicated with the first mounting cavity is formed in the first shell and/or the second shell.

11. The assembled robot toy according to claim 10, wherein a rotating hole is defined in the second mounting cavity;
the transmission gear set also comprises the second rotating rod and a limit cap, one end of the second rotating rod passes through the fourth gear and the fifth gear and then is placed in the rotating hole, and the limit cap is disposed at an opposite end of the second rotating rod; and the seventh gear is positioned between the fourth gear and the limit cap.

12. The assembled robot toy according to claim 11, wherein the first shell protrudes on one side opposite to the second shell to form a plurality of first plugging ends, a plurality of first plugging grooves are formed in one side, opposite to the first shell, of the second shell, and the first plugging end is arranged in the first plugging groove;
the gear box also comprises a plurality of reinforcing cover plates, a plurality of first clamping holes are formed in the reinforcing cover plate, a plurality of first clamping buckles are arranged on both sides of the first shell and the second shell, and the first clamping buckle is clamped with the first clamping hole.

13. The assembled robot toy according to claim 10, wherein the head part is positioned at one of the top, front and back positions of the gear box.

14. The assembled robot toy according to claim 9, wherein a first connecting rod and a second connecting rod are arranged between the head part and the gear box, and the first connecting rod is rotatably connected with the second connecting rod;
the first connecting rod is configured to drive the head part to rotate along a central axis of the first connecting rod under the action of external force, and the second connecting rod is configured to drive the head part to rotate along a direction perpendicular to the central axis of the first connecting rod under the action of external force.

15. The assembled robot toy according to claim 13, wherein a third mounting cavity and two fourth mounting cavities are formed in the bottom shell, and two conducting springs are respectively arranged in the two fourth mounting cavities and soldered onto the solar panel;

the solar panel is arranged in the third mounting cavity, the two fourth mounting cavities are arranged at intervals and are both communicated with the third mounting cavity, a third avoidance hole is formed in the face shell and/or the bottom shell at the position corresponding to the fourth mounting cavity, the motor is electrically connected with two conducting wires, the tail end of the conducting wire is provided with a conducting plate, and the conducting plate is plugged in the conducting spring.

16. The assembled robot toy according to claim 15, wherein the bottom of one end of the face shell extends downward to form a second plugging end, the bottom of an opposite end of the face shell extends downward to form a plurality of first stop blocks arranged at intervals, and the first stop block protrudes at the bottom of one side opposite to the second plugging end to form a second stop block;

a second plugging groove with a length larger than the length of the second plugging end is formed in the bottom shell, a front end of the bottom shell is arranged above the second stop block, and the second plugging end is arranged in the second plugging groove;

the head part also comprises a plurality of cover bodies with accommodating grooves, the bottom shell is connected with the face shell to form first joint ends on both sides of the head part, and the first joint ends are arranged in the accommodating grooves.

17. The assembled robot toy according to claim 13, wherein the assembly component comprises a plurality of bolts, fixed plates, connecting plates, third rotating rods, wheels, straight-line connecting rods, symmetrical semicircular pieces, U-shaped pieces, force arm connecting rods, arc-shaped connecting rods, T-shaped connecting rods, first cams, second cams, fluctuating gears, accessory spur gears and fixed rods;

any two of the gear box, the fixed plate, the connecting plate, the straight-line connecting rod, the arc-shaped connecting rod, the T-shaped connecting rod, the U-shaped piece, the force arm connecting rod, the symmetrical semicircular piece, the first cam, the second cam and the wheel are both connected through one of the bolt and the fixed rod; the accessory spur gear can be used for being meshed with the transmission gear set; the accessory spur gear, the wheel, the first cam, the second cam, the fluctuating gear and the wheel can detachably sleeve the third rotating rod or the fixed rod, and the second cam is detachably inserted on the transmission rod.

18. The assembled robot toy according to claim 17, wherein a first sliding hole and a second sliding hole perpendicular to the first sliding hole are formed in the T-shaped connecting rod, and the fluctuating gear is provided with a plurality of arc-shaped teeth arranged around the fluctuating gear; the symmetrical semicircular piece is formed by connecting two semicircular plates in central symmetry, a side wall of the second cam is surrounded by first gear teeth, and an inner side of the arc-shaped connecting rod is provided with second gear teeth meshed with the second cam;

at least one plane is formed on an outer side wall of the third rotating rod.

19. The assembled robot toy according to claim 18, wherein a plurality of annular clamping grooves are formed in the outer side walls of the fixed rod and the third rotating rod at equal intervals, the assembly component also comprises a plurality of fixed sleeves sleeving the fixed rod or the third rotating rod, at least one U-shaped opening is formed in a side wall of the fixed sleeve, and one end of an inner side wall of the fixed sleeve protrudes inward to form a second clamping block matched with the annular clamping groove;

the position of the accessory spur gear on the third rotating rod or the fixed rod is limited by two fixed sleeves respectively sleeving both sides of the accessory spur gear;

a cross section of the outer side wall of the third rotating rod is a hexagon, a cross section of an outer side wall of the fixed rod is circular, and the diameter of the fixed rod is equal to the distance between two opposite sides of the hexagon.

* * * * *